(12) United States Patent
Smith et al.

(10) Patent No.: US 6,411,002 B1
(45) Date of Patent: *Jun. 25, 2002

(54) AXIAL FIELD ELECTRIC MACHINE

(75) Inventors: Stephen H. Smith, Leucadia; Yuval Shenkal, Cardiff, both of CA (US)

(73) Assignee: Smith Technology Development, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,455

(22) Filed: Jun. 10, 1998

Related U.S. Application Data

(63) Continuation-in-part of application No. 08/763,824, filed on Dec. 11, 1996.

(51) Int. Cl.[7] .......................... H02K 21/12; H02K 1/12; H02K 1/22; H02K 3/46
(52) U.S. Cl. .................. 310/156.01; 310/261; 310/270; 310/156.02; 310/258; 310/254
(58) Field of Search .......................................... 310/261

(56) References Cited

U.S. PATENT DOCUMENTS

| | | | | |
|---|---|---|---|---|
| 4,371,801 A | * | 2/1983 | Richter | ....................... 310/156 |
| 5,575,932 A | * | 11/1996 | Goff | ........................... 219/121 |
| 5,646,464 A | * | 7/1997 | Sickafus | ............... 310/40 MM |
| 5,760,502 A | * | 6/1998 | Van Laonen et al. | ......... 310/42 |
| 5,789,841 A | * | 8/1998 | Wang | .......................... 310/179 |

* cited by examiner

Primary Examiner—Nestor Ramirez
Assistant Examiner—Julio Gonzalez R.
(74) Attorney, Agent, or Firm—Kenyon & Kenyon

(57) ABSTRACT

An axial field electric machine having an improved efficiency includes a number of magnetic elements (e.g., as a rotor) as annular disks magnetized to provide multiple sector-shaped poles. Each sector has a polarity opposite that of an adjacent sector, and each sector is polarized through the thickness of the disk. The poles of each disk are aligned with opposite poles of each adjacent magnet. Metal members adjacent the outermost disks contain the flux. The axial field electric machine also includes one or more conductor elements (e.g., as a stator) which include a number of conductor phases that traverse the flux emanating between poles of axially adjacent magnetic elements. The design of the axial field electric machine including the gap spacing between adjacent magnetic elements, the transition width between adjacent poles on each magnetic element, the number of poles, the number and width or conductor phases in the conductor element is based on the physical characteristics of the magnetic elements to increase efficiency.

2 Claims, 27 Drawing Sheets

AXIAL FIELD ELECTRIC MACHINE

RELATED APPLICATIONS

The present application is a continuation-in-part of U.S. application Ser. No. 08/763,824, filed Dec. 11, 1996, the disclosure of which is hereby incorporated by reference in its entirety.

BACKGROUND OF THE INVENTION

1. Field of the Invention

The present invention relates generally to electric machines or motor/generators and, more specifically, to permanent magnet, axial field electric machines.

2. Description of the Related Art

An electric motor/generator, referred to in the art as an electric machine, is a device that converts electrical energy to mechanical energy and/or mechanical energy to electrical energy. Since electric machines appear more commonly as motors, the ensuing discussion often assumes that electric energy is being converted to mechanical energy. However, those knowledgeable in the art recognize that the description below applies equally well to both motors and generators.

Electric machines generally operate based on Faraday's law, which can be written as e=BLv, and the Lorentz force equation, which is often written as F=BLi. In electric machines that utilize rotational motion, these equations can be written as $e=k_1 BL\Omega$ and $T=k_2 BLi$ respectively. Faraday's law describes the speed voltage or back EMF (electromotive force), e, that appears across motor conductors due to the geometrically orthogonal interaction of a magnetic field having flux density B with conductors of length L traveling at a rotational speed $\Omega$. The Lorentz force equation describes the torque T generated by the geometrically orthogonal interaction of a magnetic field having flux density, B, with conductors of length L carrying current i. The coefficients $k_1$ and $k_2$ are constants that are a function of motor geometry, material properties, and design parameters.

A variety of electric machine types exist in the art based on how they generate the magnetic field and on how they control the flow of electrical energy in the conductors exposed to the magnetic field. The present invention pertains to electric machines where the magnetic field B is primarily generated by permanent magnets affixed to the rotating assembly, or rotor of the machine; whereas the conductors are affixed to the stationary assembly, or stator of the machine and electronic circuitry is used to control the flow of electrical energy. In the art this type of machine is commonly called a brushless DC motor or a brushless permanent magnet machine. In addition, such electric machines can be modified to use induction to generate the magnetic field. In this case the machine is commonly called an induction motor.

Electric machines that produce rotational motion are classified as either radial field or axial field. Radial field machines have a radially directed magnetic field interacting with axially directed conductors, leading to rotational motion. On the other hand, axial field machines have an axially directed magnetic field interacting with radially directed conductors, leading to rotational motion. Of these two machine topologies, the axial field machine appears much less often. In the art, axial field machines are most often found in applications where: (i) there is insufficient axial length to accommodate a radial field machine, (ii) relatively little torque is needed, and (iii) motor energy conversion efficiency is not a primary concern. The reasons why axial field machines generally appear less often than radial field machines include: (a) more familiarity with radial field machines, (b) the desire to minimize cost by reusing existing radial field machine tooling, and (c) the lack of market incentive to address manufacturing issues unique to axial field machines.

In terms of quantity produced, the spindle motor in computer floppy disk drives is the most commonly appearing axial field electric machine. In this application minimizing cost is the most critical design goal. As a result, this motor does not utilize materials, design steps, or construction techniques that lead to high efficiency over a broad range of speeds, high motor constant, or high power density. The floppy disk spindle motor uses an axial field topology solely because there is insufficient axial space available inside the floppy disk housing to use a radial field motor. This motor is typically manufactured with one rotor element and one stator element, with the stator element being constructed from a steel-backed printed circuit board upon which the stator windings and motor electric drive circuitry are connected.

The present invention discloses design aspects for axial field machines that offer greater performance than common axial field machines and performance that meets, exceeds, or is competitive with radial field machines. Performance in this case includes the measures of: (i) energy conversion efficiency; (ii) motor constant, (iii) gravimetric power density, (iv) volumetric power density, (v) manufacturing cost, and (vi) construction flexibility due to modular construction.

Energy conversion efficiency describes how well an electric machine converts energy. For a motor, efficiency can be written as $$\eta = (\text{Power Out})/(\text{Power In}) = (T\Omega)/(T\Omega + P_r + P_c + P_m) \qquad \text{(Eq. 1)}$$

where T is torque, $\Omega$ is rotational speed, $P_r$ is resistive loss i.e., the so called $I^2R$ loss, which represents power converted to heat by the resistance of the current carrying conductors in the motor, $P_c$ is the core loss, which represents power converted to heat due to hysteresis and eddy current losses in the conductive and magnetic materials used in the motor, and $P_m$ is the mechanical loss, which includes bearing loss, windage, etc. Core and mechanical losses generally increase with the square of speed, so efficiency typically increases from zero at zero speed, to some peak value at some rated speed, then decreases beyond that rated speed. For constant speed applications, achieving high peak efficiency at a constant rated speed is all that is important. For variable speed applications, however, it is important to maximize the range of speeds over which maximum efficiency can be achieved. As defined in Eq. 1, efficiency is unitless and is often expressed as a percentage, where 100% efficiency reflects the ideal electric machine.

Referring to FIG. 30, a graph is presented showing the efficiency of a typical electric machine known in the art at various speeds and torque. The operation of the electric machine is bounded by a peak speed, a peak torque, and a maximum power output. In this example, the electric machine has a peak efficiency of 90% at a particular operating point (i.e., at a particular rated speed and torque). At other operating points, however, the efficiency drops off precipitously as indicated by the contours of constant efficiency. In a traction application, for example, when the electric machine is operated at different operating points on the graph, the average efficiency will be much lower than peak efficiency.

In servomotor applications where a motor does not turn continuously but rather starts and stops frequently, efficiency is not a good measure of motor performance because efficiency is zero at zero speed, i.e., $\Omega=0$. Under these conditions, the ability to produce torque with minimum losses is important. In the art the term motor constant describes the motor characteristic. Motor constant can be written and simplified as $$K_m = \frac{T}{\sqrt{P_r}} = \frac{K_T I}{\sqrt{I^2 R}} = \frac{K_T}{\sqrt{R}} \quad \text{(Eq. 2)}$$

where $K_T$ is the motor torque constant, I is the net motor current, and R is the net motor resistance. Core loss and mechanical loss are not included in the motor constant because these losses are zero at zero speed. The square root of $P_r$ is used in Eq. 2 because it makes the motor constant independent of current, which makes it independent of any motor load and makes it easier to compare the performance of different motors.

Based on Eq. 1 and Eq. 2, it is clear that a motor exhibiting high efficiency will generally exhibit a high motor constant. Likewise, if a motor exhibits minimal core loss and mechanical loss, a motor having a high motor constant will also exhibit high efficiency.

Gravimetric and volumetric power density are defined as the ratio of output power, e.g., $T\Omega$ for a motor, to the mass and volume of the machine, respectively. As such, gravimetric power density is often specified in terms of watts per pound, horsepower per pound, or kilowatts per kilogram. Likewise, volumetric power density is often specified in terms of watts per cubic inch or kilowatts per cubic meter. In most cases, there is a high degree of correlation between these two measures of power density. That is, given that electric machines are generally constructed from the same types of materials, their mass is directly proportional to their volume, thus a motor having a high gravimetric power density, will also exhibit a high volumetric power density. Given this correlation, it is common to use the term power density to mean either gravimetric or volumetric power density or both. In any case, since output power is the product of torque and speed, power density increases linearly with speed to the point where it is no longer possible to maintain torque production, at which point power density decreases. In addition, given that torque is generally proportional to current as shown in Eq. 2, the ability to produce torque is only limited by the ability to remove the heat created by the resulting $I^2R$ loss $P_r$ and the speed dependent losses $P_c$ and $P_m$, which decrease efficiency. As a result, power density is generally proportional to efficiency because more power can be safely produced in a more efficient motor. For example, a highly efficient motor generates less heat for a given torque output than a less efficient motor, which in turn implies that the more highly efficient motor can generate more torque and therefore have higher power density, while generating the same amount of heat as the less efficient motor.

In the art, electric machines of varying outputs generally require significant unique tooling for each voltage and torque level. For a given diameter it is typical to specify a number of rotor and stator lengths, with similar but different parts and tooling required for each rotor and stator. For example, in a brushless DC motor each stator may be made from the same stator laminations stacked to various lengths, but the windings are unique for every length as well as for every voltage level at any fixed length. As a result, additional cost is incurred in traditional motors due to the additional capital expense and inventory required to support a family of motors at a given diameter.

In view of the above, there is a need for an improved axial field electric machine that provides a high efficiency over a wide variety of speeds and torque and a high gravimetric and volumetric power density over a wide range of speeds and torque. There is also a need for an improved axial field electric machine that allows for easy modification of the rotor and/or stator to increase or decrease the power output of the electric machine.

SUMMARY OF THE INVENTION

These and other needs are satisfied by the axial field electric machine of the present invention. Based on the above discussion, the present invention discloses design aspects for an axial field electric machine that maximize efficiency, motor constant, power density, as well as offer the benefits of modular construction, and the potential for reduced cost. Efficiency and motor constant are maximized by maximizing the production of torque while incurring minimal losses. In particular, one aspect of the invention eliminates all ferromagnetic material that incurs core loss, thereby essentially eliminating $P_c$ from Eq. 1, above (although eddy current losses in the conductors must be considered). Doing so increases peak efficiency, broadens the range of speeds over which efficiency is high, and increases power density by eliminating the high mass associated with the added stationary ferromagnetic material. In addition, other aspects of the invention minimizes $P_r$, which maximize motor constant and maximizes the peak efficiency. Power density is maximized further according to an embodiment of the present invention by optimum selection of the amount of permanent magnet material relative to stator volume. Modular construction allows a whole family of motors at varying power levels to be constructed by stacking sets of identical rotor components and stator components axially within the same motor. Since each rotor and stator is identical, no duplication of capital cost is incurred to produce a whole family of motors. In addition, other aspects of the invention make it possible to select a variety of voltage levels by simply changing the way individual stators are connected, thereby minimizing the inventory required to support a whole family of motors.

DETAILED DESCRIPTION

Figure 1:
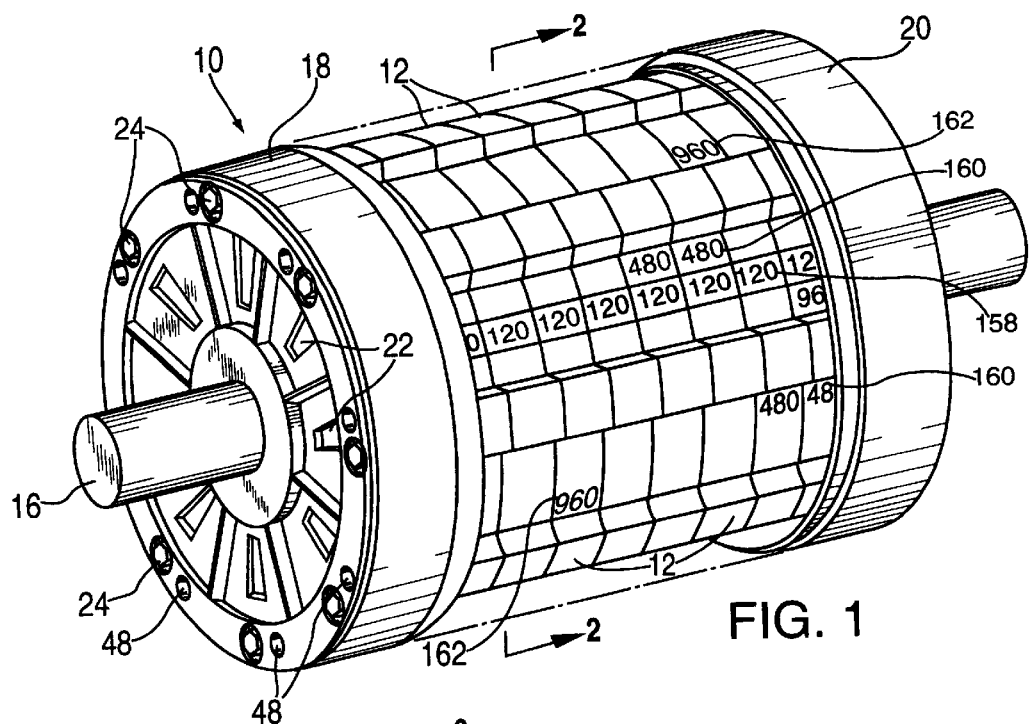
FIG. 1 is a pictorial view of an exemplary axial field electric machine of the present invention.

With reference to the drawing figures, a number of embodiments of the present invention are shown that maximize peak efficiency, efficiency over a broad range of speeds, motor constant, and power density. Also with reference to the drawing figures, an axial field electric machine according to embodiments of the present invention will be described that has a modular design that allows for cost effective creation of an entire family of machines for varying applications.

Conductor Element

As used herein, the term conductor element refers to an element of the axial field electric machine that provides conductors that traverse the magnetic flux generated by an adjacent magnet or magnetic element. In a motor application, the conductors in the conductor element carry electric current in response to a motor controller, and in a generator application, electric voltage is induced across the conductors by the magnet or magnetic element. In the examples given below, the stator of the axial field electric machine includes one or more conductor elements. One skilled in the art will recognize that in an alternative embodiment, the conductor elements could also form the rotor of the axial field electric machine, in which case magnetic elements form the stator of the electric machine.

To achieve a high power density, each conductor element is designed so as to maximize the amount of conductive material (e.g., as conductor phases) that traverses the magnetic flux from adjacent magnets or magnetic elements. Conductive material that does not traverse this magnetic flux contributes to the mass and losses of the machine and thereby reduces the efficiency and power density of the machine. To achieve a modular design, it is advantageous if each conductor element is similar in construction.

Figure 14:
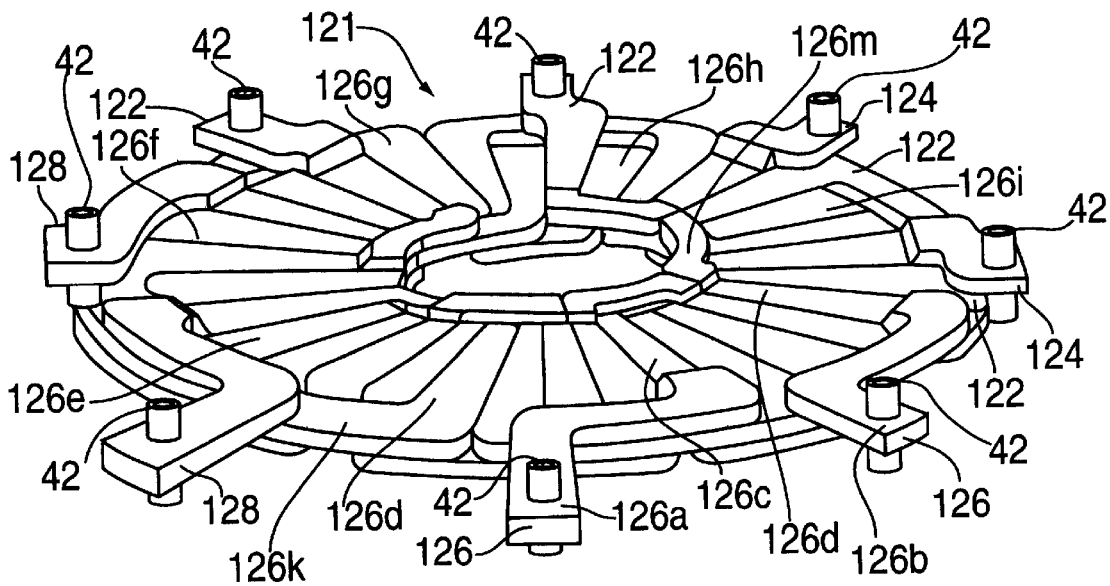
FIG. 14 is a pictorial view of an alternative conductor element winding arrangement having single-turn, rectangular cross-section conductors.

A first embodiment of a conductor element is shown in FIG. 14. In this embodiment, the conductor element 121 includes four phase windings 122, 124, 126, and 128, each having a dielectric coating or the like to electrically insulate one phase winding from the other. Each conductor in the phase winding has a generally rectangular cross-sectional shape with a generally constant axial thickness and a width that tapers linearly with the radius of the conductor element. As shown in FIG. 14, each phase winding starts at a first terminal point (e.g., first terminal point 126a of phase winding 126) at the outer periphery of the conductor element 121, extends in a radial direction as a radial conductor section 126c towards the center of the conductor element, extends in an arcuate path at the center (not visible) and extends away from the center as a radial conductor section 126d to the outer periphery of the conductor element to form a loop. Each phase winding may include a number of loops around the conductor element. In this example, phase winding 126 includes four such loops and eight radial conductor sections 126c–126j between first terminal point 126a and a second terminal point 126b distributed uniformly around the conductor element. The radial conductor sections are connected at the center and periphery by arcuate sections such as outer arcuate section 126k and inner arcuate section 126m.

Figure 13:
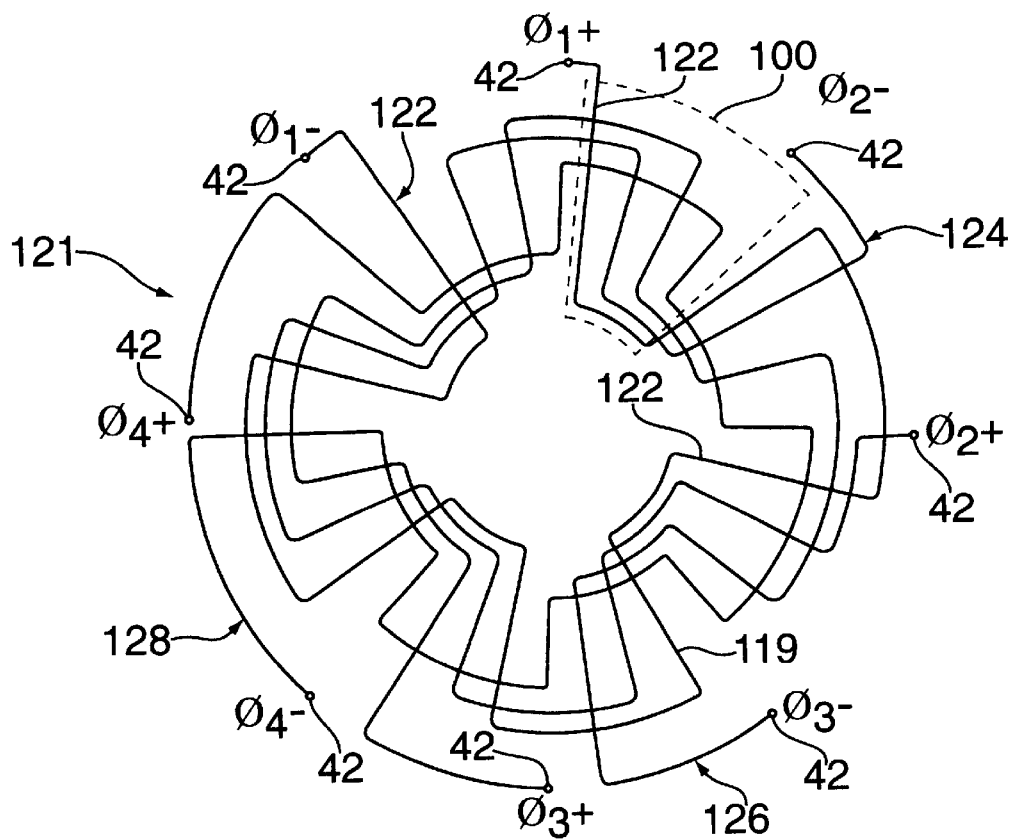
FIG. 13 is a schematic diagram of the conductor element winding arrangement of FIG. 11.

The current path in conductor element 121 of FIG. 14 is shown in FIG. 13. Phase winding 126, for example is shown as extending between a point labeled $\phi_3-$ and $\phi_3+$ and crosses between the periphery of conductor element 121 and an inner portion of the element eight times.

Returning to FIG. 14, in this example, each radial section of a conductor winding is offset from another radial section in the same phase winding by radial sections of each of the other phase windings. In other words, radial section 126c and radial section 126d are offset from each other by a radial section from each of phase windings 122, 124, and 128. The phase windings define a generally planar or wheel-like structure, with a total of 32 radial sections arranged in a spoke-like manner. In this example, conductive sockets 42 are provided at the terminal points for electrically coupling one conductor element to another.

As will be described in further detail below, conductor element 121 is adapted to be placed axially adjacent to a magnetic element such as a magnetic disk with sector shaped poles. The relationship of one of these poles to conductor element 121 is shown in FIG. 13 in a dashed outline form as element 100. To maximize the amount of conductive material in the conductor phases adjacent to the magnetic poles, each radial section is tapered or wedge-shaped, i.e., their widths decrease in a radially inward direction, thereby allowing them to be packed closely together in the spoke-like arrangement. Phase windings 122, 124, 126 and 128 are made of metal, preferably cast or otherwise formed into the illustrated winding shape, but it may also be suitable to form dielectric coated rectangular tapered metal wire into the illustrated winding shape to reduce eddy currents in the conductors. Packing conductors 122, 124, 126 and 128 closely together maximizes the amount of their conductive material that passes through the flux. The ratio between the volume of conductive material that passes through the magnetic flux and the volume of the entire conductor element that passes through the flux is known as the "fill factor." The fill factor for the stator shown in FIG. 14 is generally greater than 80 percent and is typically between 60% and 90%. Increasing the fill factor maximizes the efficiency and motor constant as given in Eqs. 1 and 2 above by minimizing the resistance R of the conductive material. Power density is also improved by maximizing the fill factor even though the conductive material adds mass to the machine because the added conductive material promotes torque production.

In an alternative embodiment of the stator, each conductor element comprises one or more subassemblies, each formed, for example, of printed circuit material that has been suitably etched to form the conductor pattern and electrical interconnections between subassemblies described below. The printed circuit material and etching process may be any such material and process known in the art that is commonly used to manufacture printed circuit boards or flexible printed circuits in the electronics industry. The subassemblies can be bonded together or otherwise attached to one another. The resulting multiple-layer printed circuit conductor element functions in the same manner as conductor element 121 in FIGS. 13 and 14, described above. In that regard, this alternative conductor element may have any suitable number of conductor windings and conductor phases. The alternative stator assembly may have a thickness as small as about 0.1 inches, thereby facilitating the construction of smaller axial field electric machines. Nevertheless, a typical alternative conductor element for a small electric machine (e.g., one producing 7.5 HP) may have a thickness of about 0.25 inches. Larger motors may be constructed using an alternative conductor element having a thickness as great as about two inches.

Figure 16A:
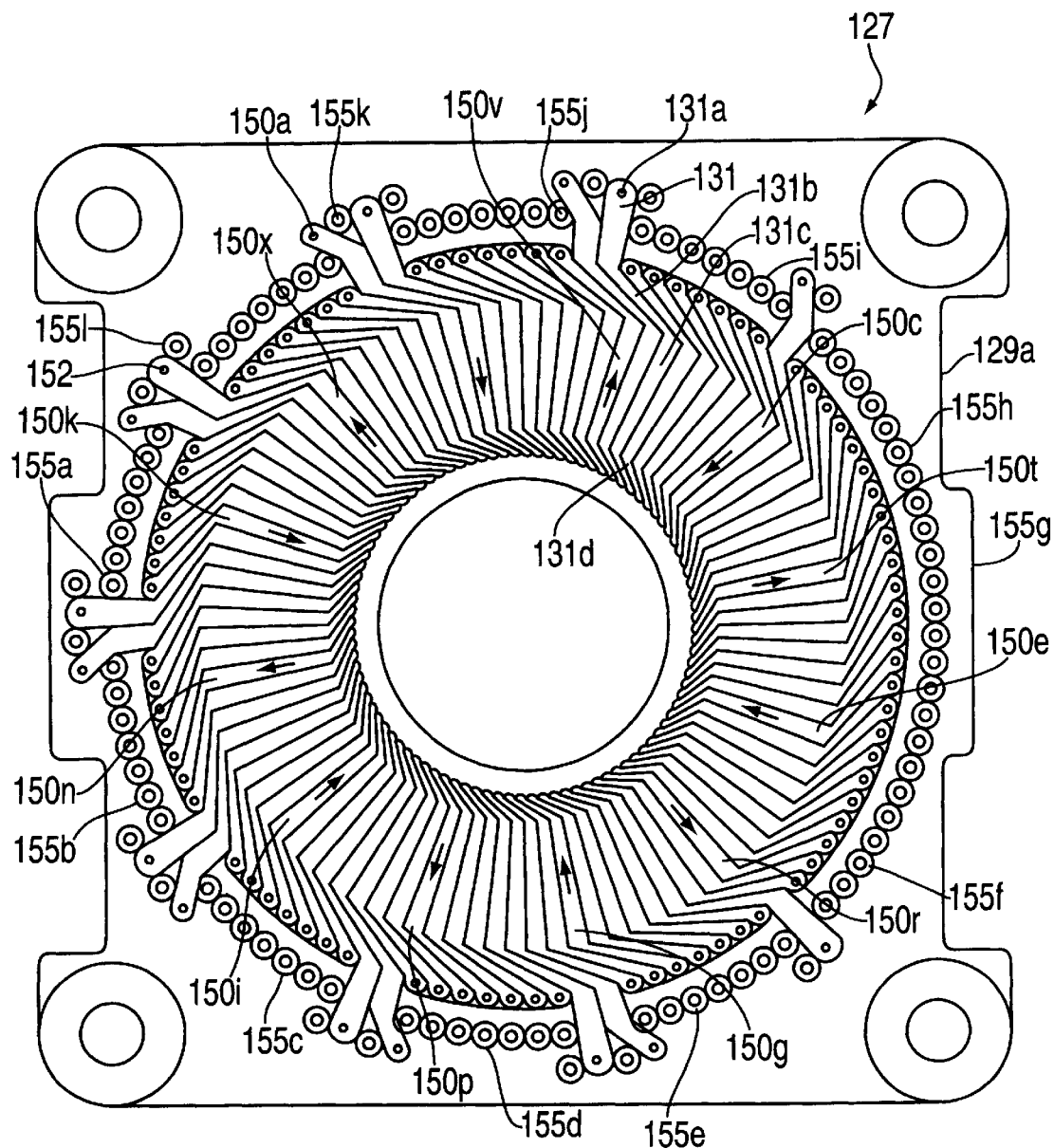
FIGS. 16a–f are views of a plurality of subassemblies in an alternative conductor element.
Figure 16B:
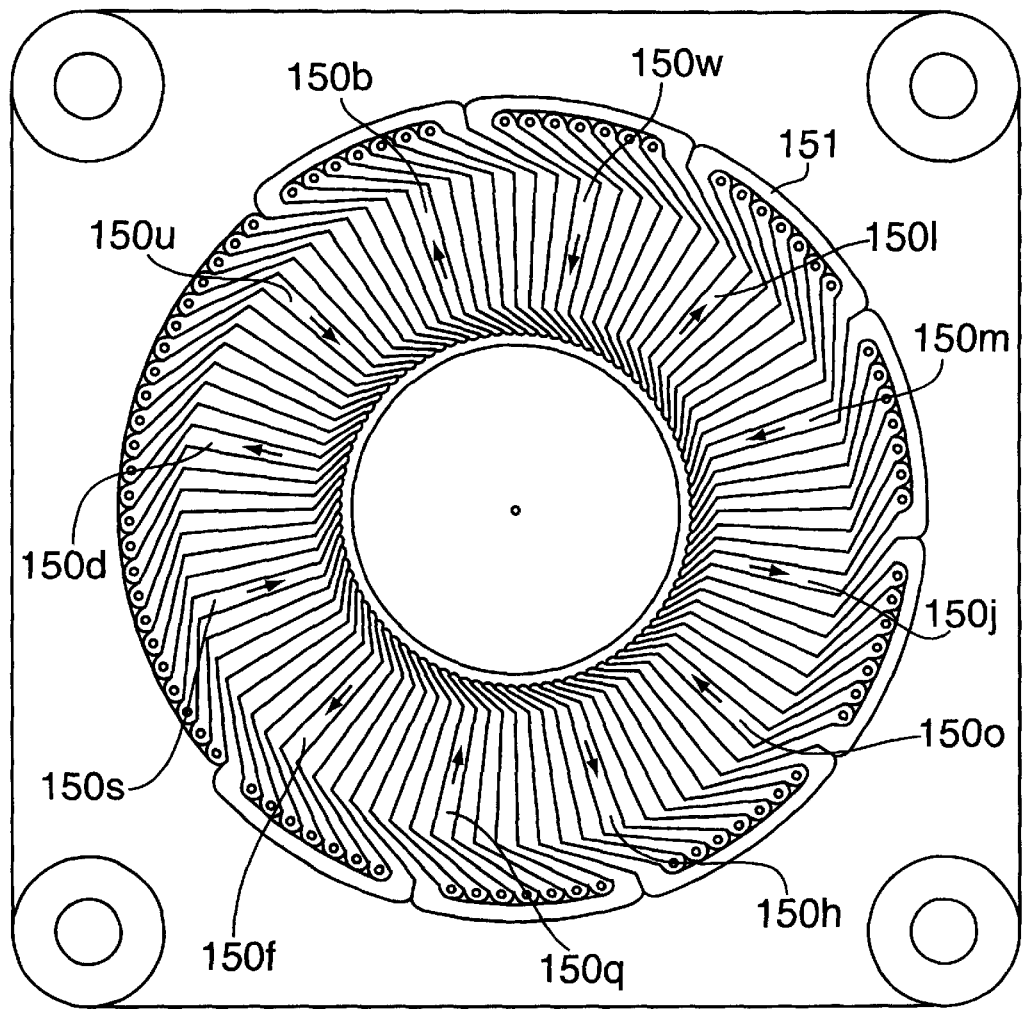

This alternative conductor element includes one or more subassemblies such as subassembly 129 in FIGS. 16a–b. Subassembly 129 includes a substrate 129a having first and second sides, which is made of a suitable dielectric or insulating material. Multiple conductive traces 131 are formed on substrate 129a to provide conductor windings in subassembly 129. For example, substrate 129a can be made of a common substrate material such as FR4 or other thin sheet-like plastic material. In this embodiment, subassembly 129 includes a composite material sheet, commonly referred to as "flex PC," where substrate 129a is a thin sheet-like plastic which is bonded to copper. For example, substrate 129a can have a thickness less than about 0.010 inches (10 mils) thick and is preferably 1 to 3 mils thick. The flex PC material includes a dielectric substrate and a 3 mil thick layer of copper on each of the first and second sides of the substrate. Conductive traces 131 are formed on substrate 129a by etching away copper between adjacent traces. To increase the amount of conductive material in each subassembly 129, the thickness of the conductive traces 131 is then increased to six mils on the first and second sides of the substrate. This can be achieved using a well-known mask and sputtering technique. The space between adjacent conductive traces 131 is filled with a dielectric resin. In this embodiment, the dielectric material for substrate 129a and for separating adjacent traces 131 is rated to 2000 volts. The spacing between adjacent conductive traces in this example is on the order of ten mils and is preferably about four mils.

In this example, each conductive trace has a thickness of six mils, but can be increased to 15 mils. As shown in FIG. 16a, each conductive trace 131 includes an outer section 131b, a radial section 131c that extends in a generally radial direction from an outer diameter to an inner diameter of the conductor element, and an inner section 131d that extends from the radial section 131c towards a center of the conductor element. As with the conductor element 121 of FIG. 14, subassembly 129 is designed to maximize the amount of conductive material adjacent to the magnetic poles of an axially adjacent magnetic element (described below). In other words, subassembly 129 is designed to maximize the amount of conductive material in the radial sections 131c of each conductive trace 131. Doing so maximizes the fill factor which in turn contributes to maximizing efficiency, motor constant, and power density.

Figure 17:
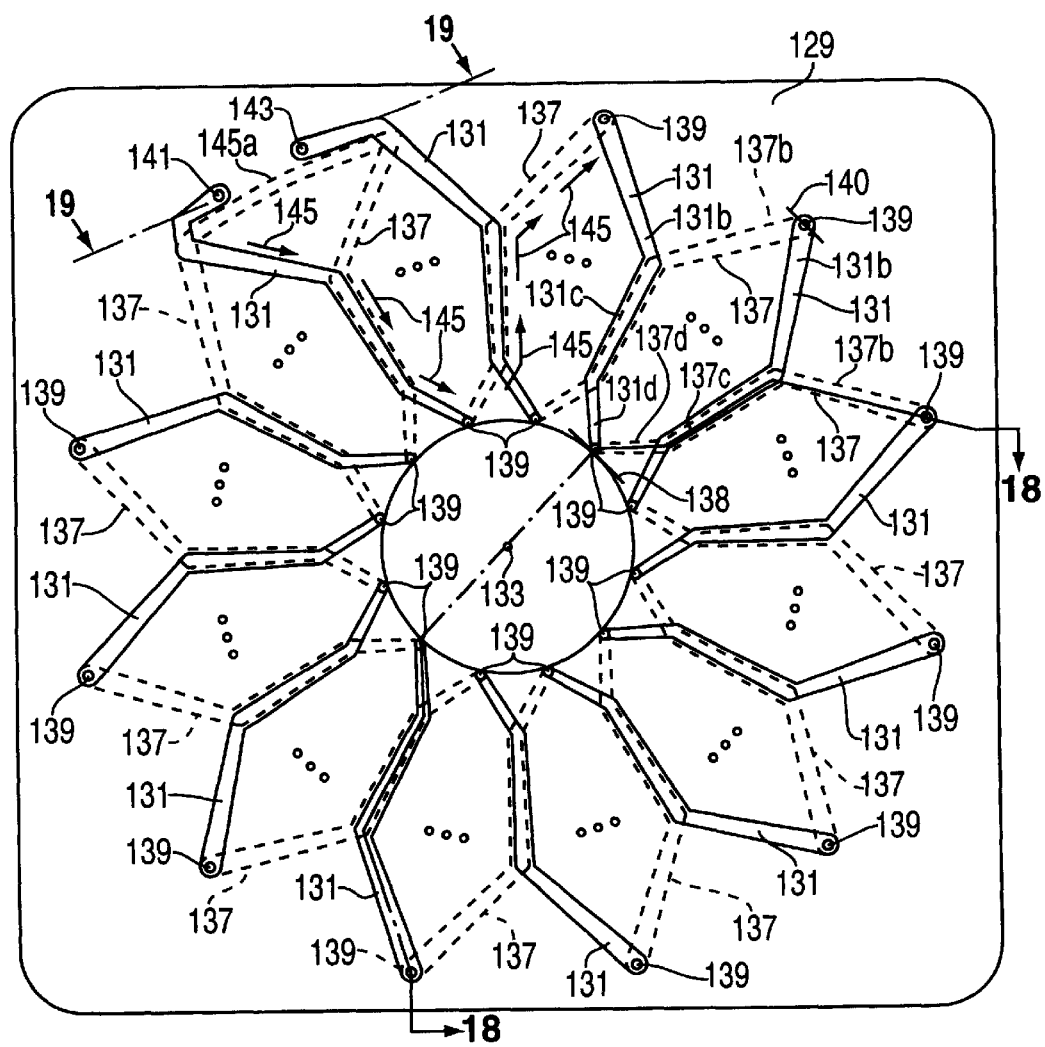
FIG. 17 is a top plan view of another subassembly in an alternative conductor element illustrating both sides of the subassembly.
Figure 18:
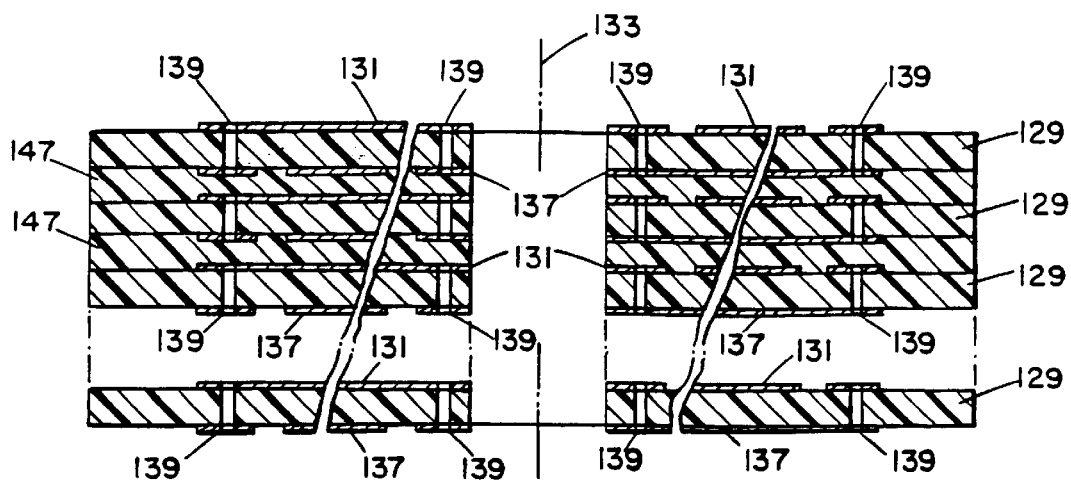
FIG. 18 is a sectional view taken along line 18—18 of FIG. 17, showing multiple subassemblies.

As illustrated in FIGS. 17 and 18, each subassembly can have conductive traces on both sides of substrate 129a, in the manner associated with what is commonly known as a two-sided printed circuit board. In FIG. 17, conductive traces 131 on the first side are shown in a solid line, and conductive traces 137 on the second side are shown in a dashed line. Conductive traces 131 and 137 are essentially identical, mirroring one another in size and position. Each end of a conductor 131 is electrically connected to an end of a conductor 137 via an inter-side through-hole 139. Each inter-side through-hole 139 is plated on its interior to provide a conductive path in a manner well-known in multi-layer printed circuit board manufacture.

A first terminal through-hole 141 is disposed at one end of one of conductive traces 131 (i.e., coupled to a terminal portion 131 a of conductive trace 131), and a second terminal through-hole 143 is disposed at one end of another of conductive traces 131. Terminal through-holes 141 and 143 are plated through-holes similar to inter-side through-holes 139, but they do not connect conductive trace 131 to conductive trace 137. Rather, terminal through-holes 141 and 143 form the terminals of an electrical circuit. The conductor path of the circuit, a portion of which is indicated by arrows 145 in FIG. 17, begins at terminal 141, follows one of conductors 131 on the first side of substrate 129a changes sides via one of inter-side through-holes 139, and continues through one of conductors 137 on the second side of the subassembly. The portion of the conductor path indicated by arrows 145 defines a winding. (In this example, the winding has only a single turn of conductor, in a manner similar to the embodiment described above with respect to FIG. 14.) The circuit then follows a second winding by again changing sides via another of inter-side through-holes 139, and continues through another of conductive traces 131. The connections continue in such a manner (e.g., in a clockwise manner) until bridge portion 145a. The connections proceed in an opposite direction (e.g., in a counter-clockwise manner) to terminal 143. The circuit shown in FIG. 17 includes twelve windings between the two sides of the subassembly.

As shown in FIGS. 16 and 17, and as stated above, each conductive trace 131 includes an outer section 131b, a radial section 131c, and an inner section 131d. The inner section 131d and the inner section 137d of a conductive trace on the other side of substrate 129a are coupled via an inter-side through-hole 139. In this embodiment, the inner sections 131d and 137d form substantially 45° angles with a line 138 tangential to an inner radius of subassembly 129. Connecting the inner connector portions 131b and 137b in such a manner minimizes the resistive or $I^2R$ loss $P_r$ in the electric machine. Likewise, in this embodiment, the outer connector portions 131b and 137b, coupled together by an inter-side through-hole 139, form substantially 45° angles with a line 140 tangential to an outer radius of subassembly 129 for the same purpose.

Figure 19:
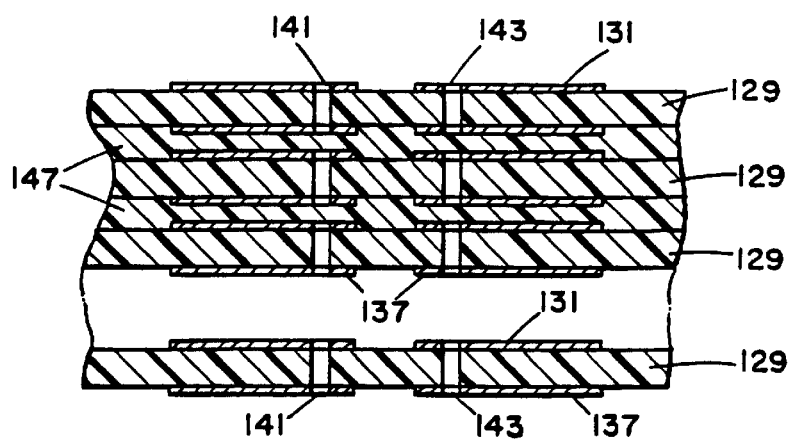
FIG. 19 is a sectional view taken along line 19—19 of FIG. 17.

Although a conductor element may include only the windings of a single subassembly 129, such as that shown in FIG. 17, a conductor element can include windings of multiple subassemblies electrically connected in series or parallel. As illustrated in FIG. 18, subassemblies 129 are bonded together to form a conductor element. A plastic sheet 147 (e.g., of a dielectric or insulating material such as the commonly known Prepreg material) between layers 129 bonds the laminations together when heated and subjected to pressure, and also electrically insulates conductive traces 137 of one subassembly from conductive traces 131 of an adjacent subassembly. As illustrated in FIG. 19, terminal through-holes 141 of all subassemblies are electrically connected together, and terminal through-holes 143 of all subassemblies are electrically connected together, thereby electrically connecting the windings in parallel to form a conductor element.

Figure 16C:
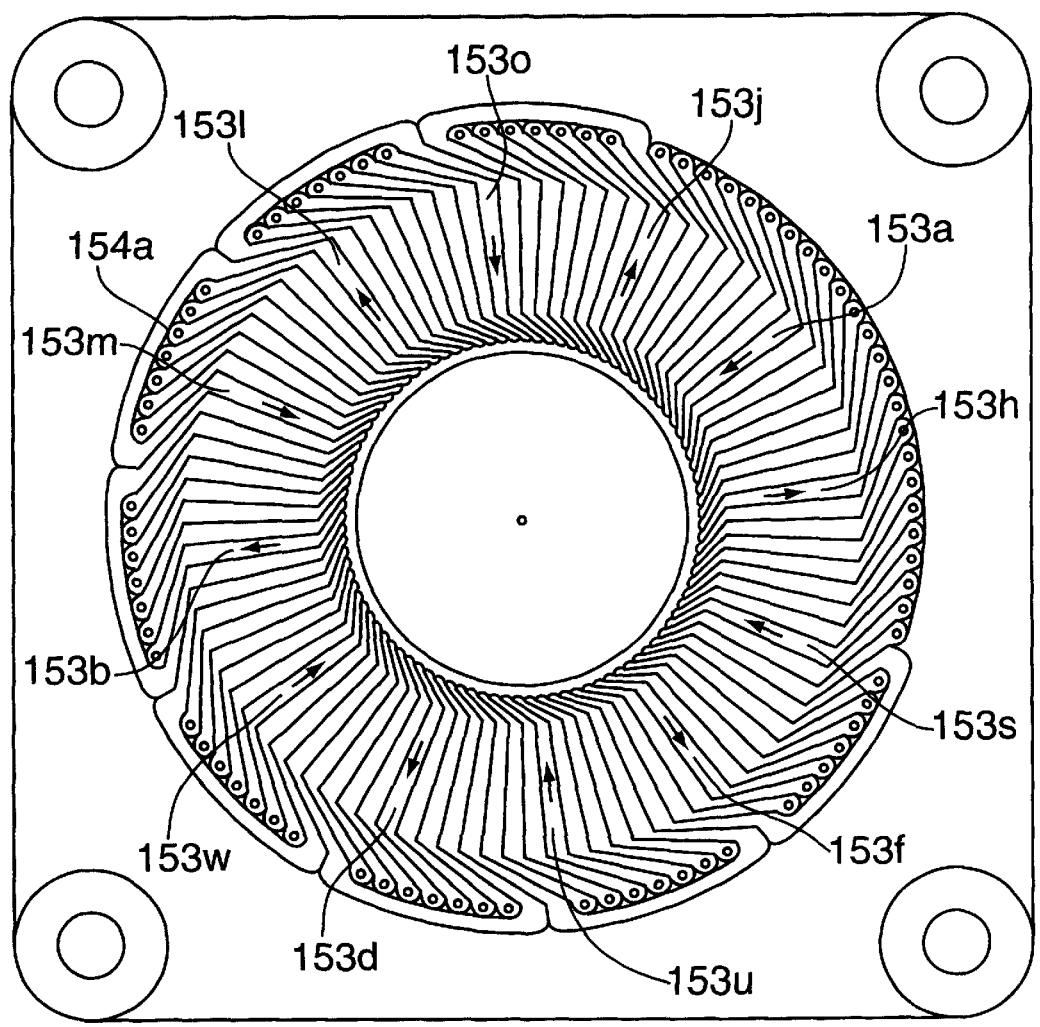
Figure 16D:
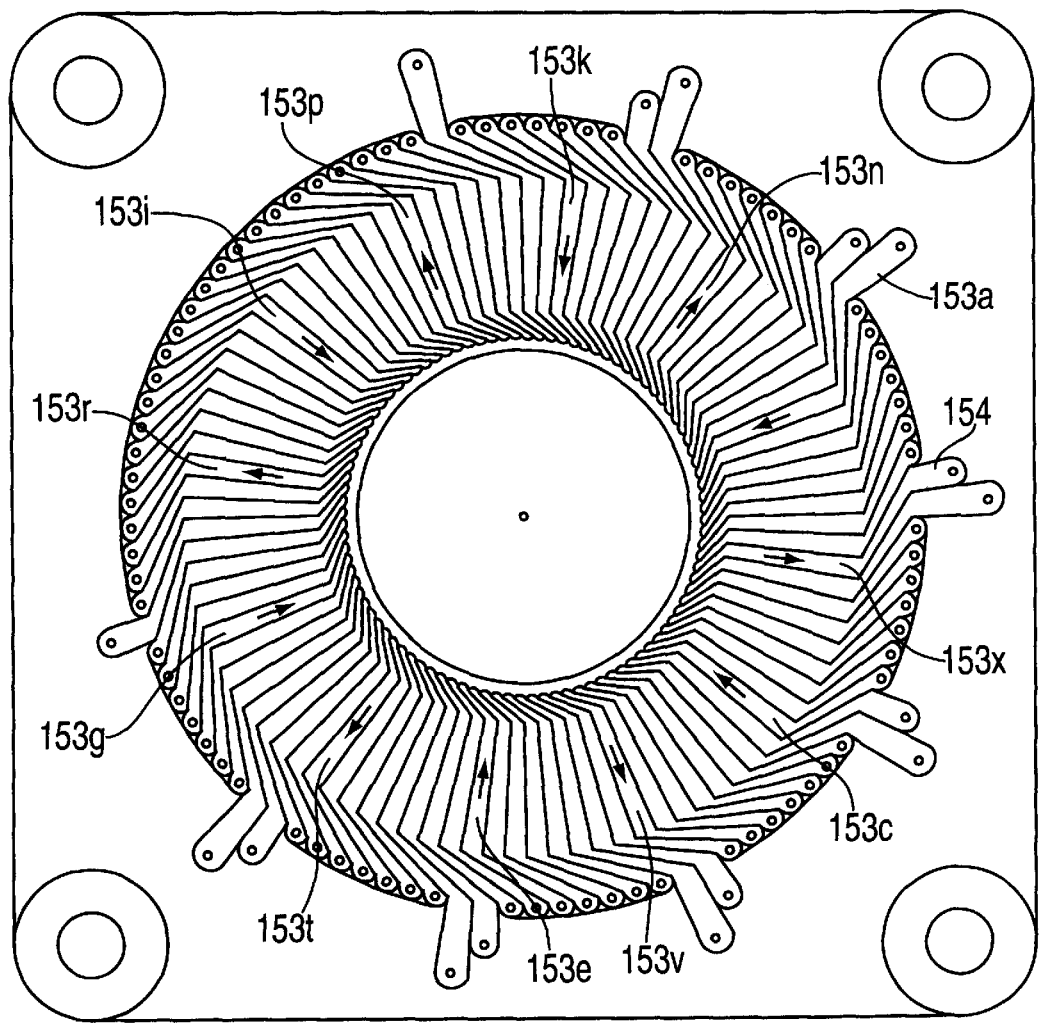
Figure 16E:
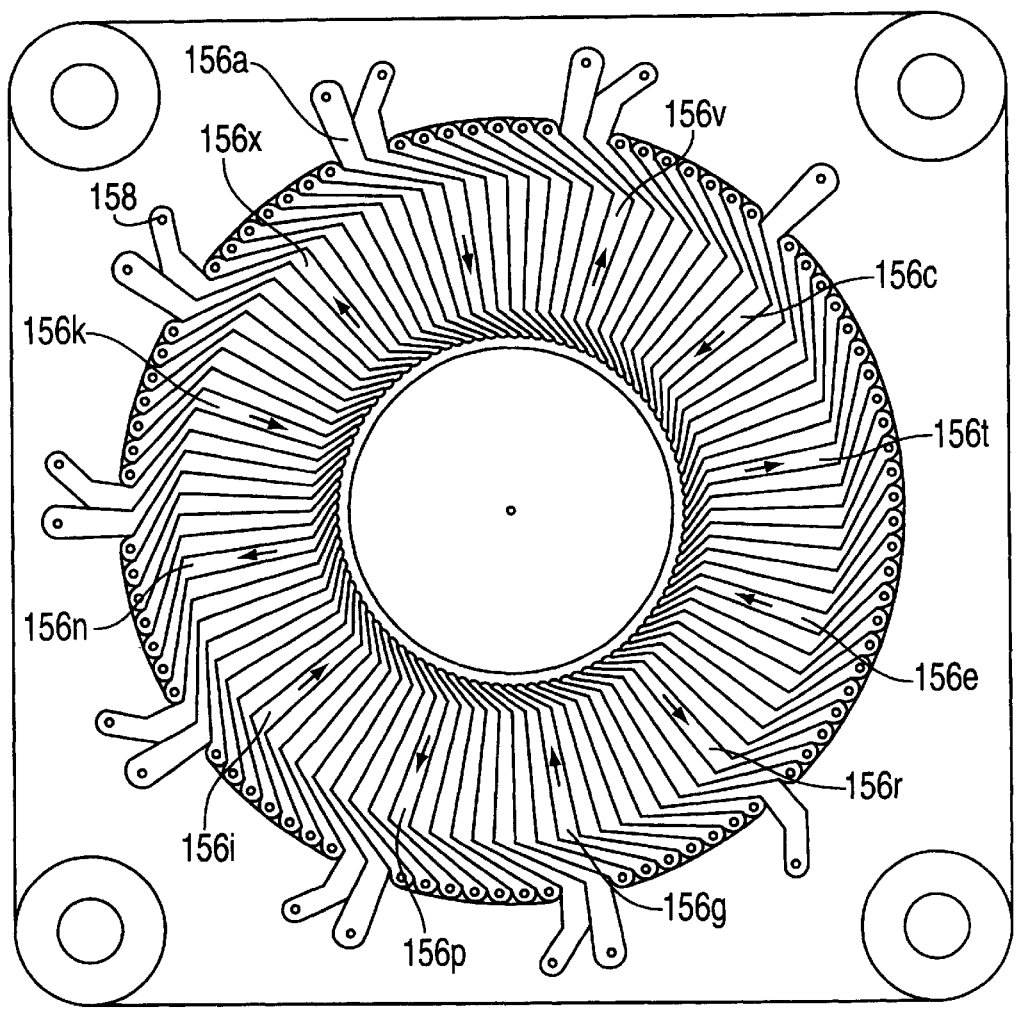
Figure 16F:
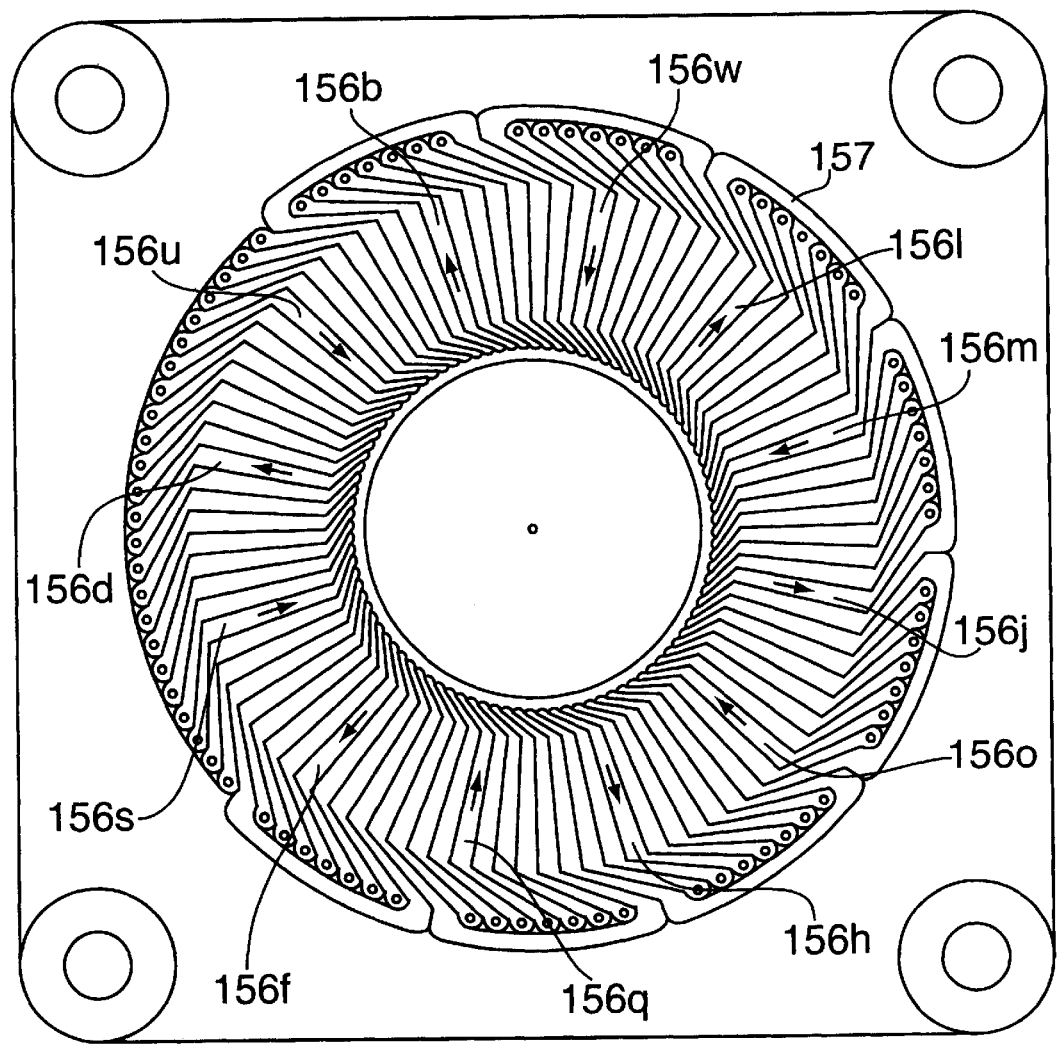

Referring to FIGS. 16a–f, the different subassemblies are connected in serial. One skilled in the art will appreciate that individual subassemblies can be joined in series and/or parallel, as desired, in a conductor element. FIGS. 16a–b depict the first and second sides of a topmost subassembly, FIGS. 16c–d depict the first and second sides of a second subassembly (i.e., under the subassembly of FIGS. 16a–b), and FIGS. 16e–f depict the first and second sides of the bottom subassembly. In this example, one of the conductor windings begins at a terminal portion 150a and extends in a generally radial direction towards the center of the conductor element 129. In FIGS. 16a–f, arrows are used to show a relative direction of current in radial portions of this conductor winding. Conductor 150a is coupled to conductor 150b on the opposite side of the subassembly as shown in FIG. 16b via an inter-side through hole. Conductor 150b is coupled to conductor 150c (FIG. 16a) via. another inter-side through hole. Accordingly, in FIGS. 16a–b, conductors 150a–l are coupled together. Referring to FIG. 16b, a bridge portion 151 couples conductor 150l to 150m. Conductors 150m–x are coupled together in a manner similar to conductors 150a–l. In summary, the conductor winding in the subassembly shown in FIGS. 16a–b starts at terminal portion 150a and continues through conductors 150b–l, bridge portion 151, conductors 150m–x and terminal section 152.

In this embodiment, terminal section 152 on an upper side of the subassembly shown in FIGS. 16a–b is coupled to terminal section 153a on a bottom side of the subassembly shown in FIGS. 16c–d via a terminal through hole. In a manner similar to what is described above, the conductor winding in the subassembly shown in FIGS. 16c–d starts at terminal portion 153a and continues through conductors 153b–l, bridge portion 154a, conductors 153m–x and terminal section 154. Terminal section 154 is coupled to another terminal section in the next subassembly not shown via a terminal through hole 155a (FIG. 16a). Terminal through holes 155b–k likewise couple terminal sections of conductor windings in adjacent subassemblies in the conductor element (as do the other unlabelled terminal through holes). In the conductor assembly of FIGS. 16a–f, thirteen subassemblies are coupled together in such a manner. Terminal through hole 155k couples a terminal section in the twelfth subassembly (not shown) to the terminal section 156a of the thirteenth subassembly shown in FIGS. 6e–f. The conductor winding starts at terminal section 156a and continues through conductors 156b–l, bridge section 157, conductors 156m–x and terminal section 158. Terminal section 158 is coupled to the uppermost side of the first subassembly via a terminal through hole 155l. Accordingly, a serial connection of the conductor windings begins at the terminal section 150a and ends at terminal through hole 155l in FIG. 16a.

Figure 20:
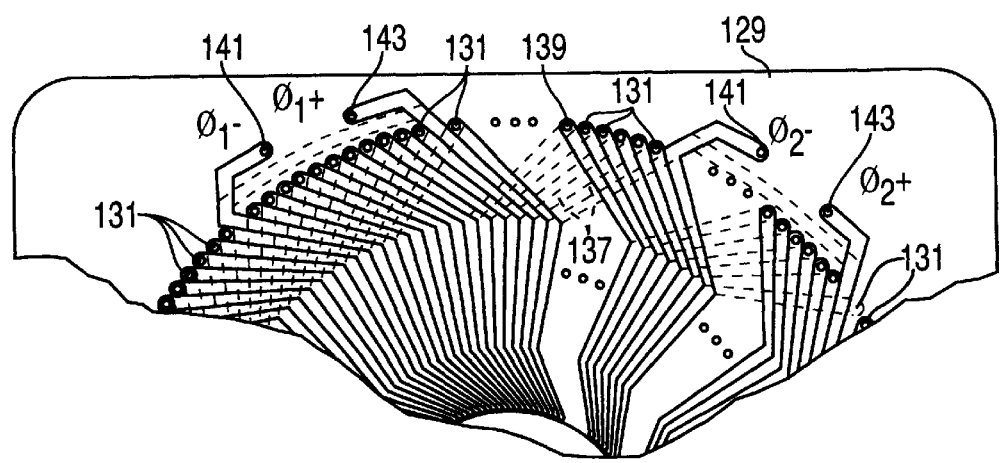
FIG. 20 is a partial top plan view similar to FIG. 17, but showing the portion of the conductor element winding arrangement relating to 12 phases of windings of one of the subassemblies.

In the example of FIG. 20, the conductor element includes twelve conductor phase windings. In the 12-phase conductor element of FIG. 20, conductive traces 131 and 137 are arranged at an angular spacing of 2.5 degrees and two conductive traces 131 from one phase are separated by eleven conductive traces 131 from the other phase windings. For purposes of clarity, only a portion of the conductor element is shown in FIG. 20, illustrating the pair of terminals for phase-1, labeled "$\phi_1^+$" and "$\phi_1^-$", and the pair of terminals for phase-2, labeled "$\phi_2^+$" and "$\phi_2^-$". Nevertheless, the completed conductor element would have 12 pairs of terminals for phases 1–12. In the example of FIGS. 16a–f, the conductor element includes eight conductor phase windings. In this example, adjacent conductive traces from one phase are separated by one conductive trace from each of the other seven phases.

In the embodiments of the conductor element described above with respect to FIGS. 16–20, a fill factor for the conductor element can be between 60 and 90% and is typically between 80% and 84%.

In view of the embodiments illustrated in FIGS. 14, and 16–20, persons of skill in the art will understand that in other embodiments the conductors may have any suitable size, shape, and number of windings and turns. For example, in an embodiment similar to that illustrated in FIG. 14, each winding may have two turns of rectangular wire having wedge-shaped elongated portions.

Magnetic Element

In the axial field electric machine of the present invention, one or more magnetic elements are provided that interact with the conductor elements discussed above with respect to FIGS. 14 and 16–20. For example, the rotor of the axial field electric machine can include one or more magnetic elements such as the rotor disk 14 shown in FIG. 4. Again, to achieve a high efficiency, motor constant, and power density for the axial field electric machine, it is advantageous if the magnetic elements have a low density and a high energy product (as discussed further below).

Figure 4:
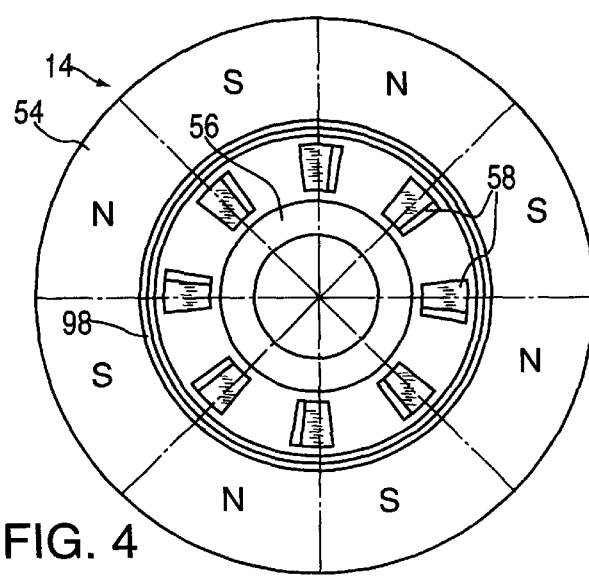
FIG. 4 is a face view of a magnetic element of the axial field electric machine, showing the polarization of the magnet.

As illustrated in FIG. 4, each rotor disk 14 may include an annular magnet 54 mounted on a hub 56. Hub 56 can have hub ventilation openings 58 with angled, vane-like walls for impelling cooling air through housing 10. Each magnet 54 may be made from a suitable ferroceramic material, such as M-V through M-VIII, oriented barium ferrite (BaO—

6Fe$_6$—O$_2$), strontium ferrite (SrO—6Fe$_6$—O$_2$), or lead ferrite (PbO—6Fe$_6$—O$_2$). Alternatively, magnets 54 may made from a bonded or sintered neodymium-iron-boron (NdFeB) material. Both ferroceramic magnets and NdFeB magnets are known in the art and commercially available. As illustrated in FIG. 4, magnet 54 is polarized to provide multiple magnetic poles or sectors 57 uniformly distributed angularly around magnet 54. Alternatively, each magnetic element or rotor disk can include a plurality of individual sector-shaped magnets that are joined together into an annular shape with an appropriate adhesive or support structure.

Figure 5:
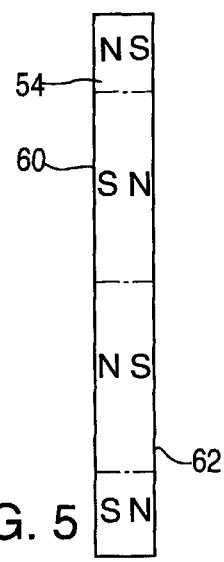
FIG. 5 is a side elevation view of a magnetic element.

As illustrated in FIG. 5, each sector is polarized through the thickness of magnet 54. Thus, each sector has opposite poles on opposite faces 60 and 62 of the magnet 54. In addition, the poles of sectors 57 on face 60 alternate with those of adjacent sectors 57 on face 60, and the poles of sectors 57 on face 62 alternate with those of adjacent sectors on face 62. In this embodiment, each rotor disk 14 is to be mounted on a shaft with the poles of its magnet 54 axially aligned with opposite poles of any adjacent magnets 54 (i.e., a North pole on face 62 of a first rotor magnet 54 will be axially aligned with a South pole on face 60 of a second axially adjacent rotor magnet 54). Magnetic flux therefore travels axially between such axially aligned poles.

Figure 10:
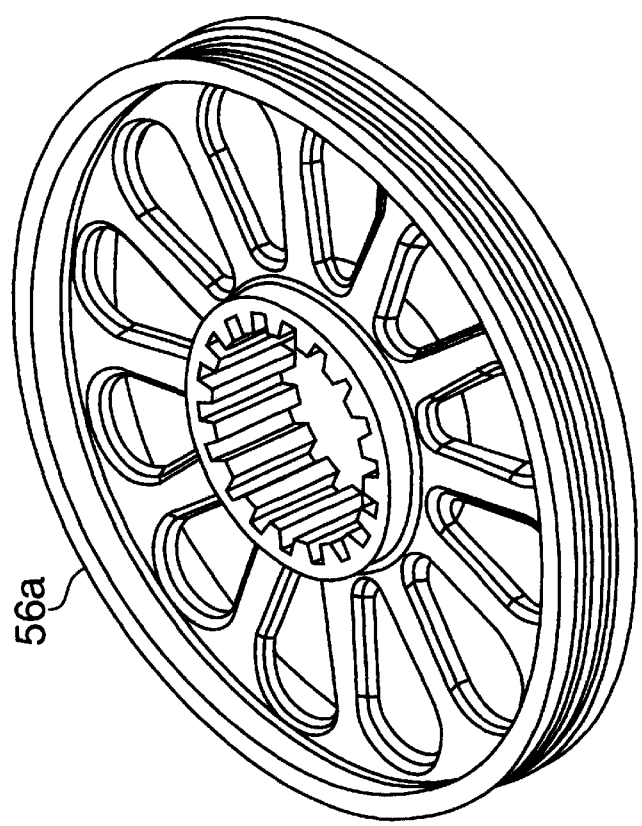
FIG. 10 is a pictorial view of a hub that can be mounted to the shaft of FIG. 9.
Figure 9:
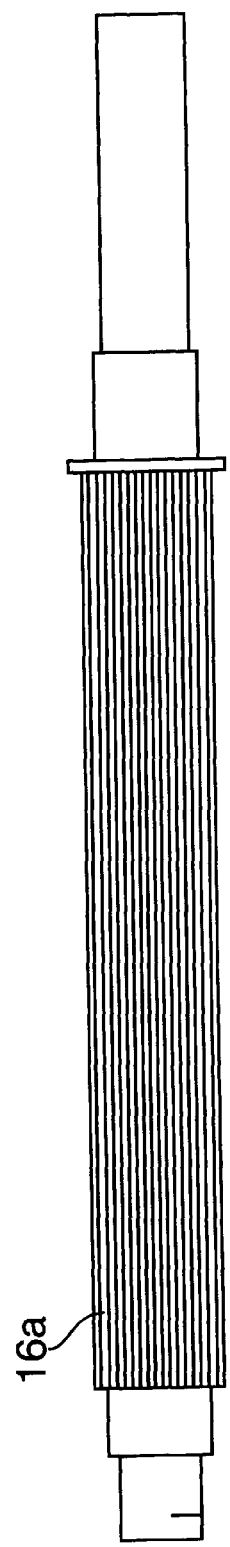
FIG. 9 is a pictorial view of a shaft for use in the axial field electric machine of the present invention.

As discussed above in this example, magnet 54 is mounted to a hub 56 which in turn is mounted to a shaft. Referring to FIG. 9, an example of a shaft 16a is shown. Shaft 16a is splined and provides a mating surface for the central portion of the hub 56a as shown in FIG. 10. It is preferable if magnet 54 is mounted to hub 56a before being magnetized to ensure proper orientation between adjacent magnets when the hub 56a is placed onto shaft 16a.

Figure 15:
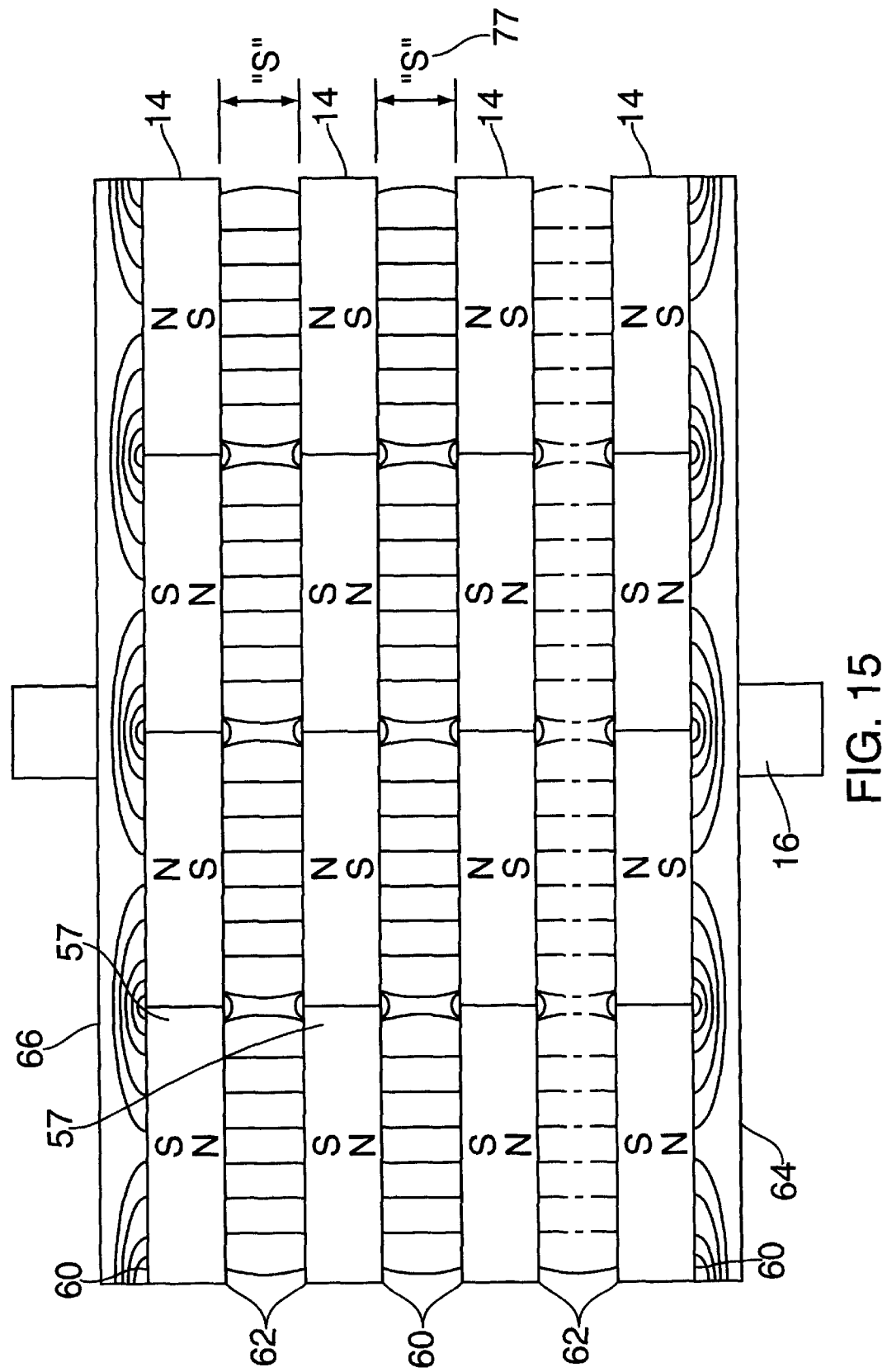
FIG. 15 is a flux diagram for a plurality of magnetic elements.

As illustrated in FIG. 15, annular disks or endplates 64 and 66, made of a suitable high-permeability material such as steel, are mounted to outer faces 60 of the magnet 54 of the endmost two rotor disks 14. Endplates 64 and 66 contain the magnetic flux between adjacent poles of the rotor magnet 54 adjacent to endplate 64 or 66. By mounting high permeability endplates to the endmost two rotor disks, the endplates rotate with the rotor magnet thereby eliminating the core loss associated with the high permeability material in the flux path of the magnets. As a result, the efficiency of the electric machine is maximized.

As illustrated in FIG. 15, conceptually, the magnetic flux only "flows" from a sector 57 of a first one of the two endmost rotor disks 14, through axially aligned sectors 57 of adjacent magnets 54 until reaching the second one of the two endmost rotor disks 14, where one of endplates 64 and 66 directs the flux to an angularly adjacent sector 57. The flux then returns axially through aligned sectors 57 of adjacent magnets 54 until again reaching the first endmost rotor disk 14, where the other of endplates 64 and 66 directs the flux to an angularly adjacent sector 57. The magnets 54 other than the two endmost magnets 54 may be referred to herein for convenience as inner rotor disks or magnets 54. The flux thus follows a serpentine pattern, weaving axially back and forth through aligned sectors 57 of magnets 54.

Magnet 54 has at least one South and one North pole on each side 60 and 62. The minimum number of magnet poles distributed around each face 60 or 62 of magnet 54 is a function of the demagnetization characteristics of the magnet material used. If the demagnetization characteristic has a "knee" in the second quadrant of its B-H curve at room. temperature, the number of magnet poles must be sufficiently large to keep the magnet poles from being irreversibly demagnetized before magnet 54 is assembled into the electric machine.

Figure 6:
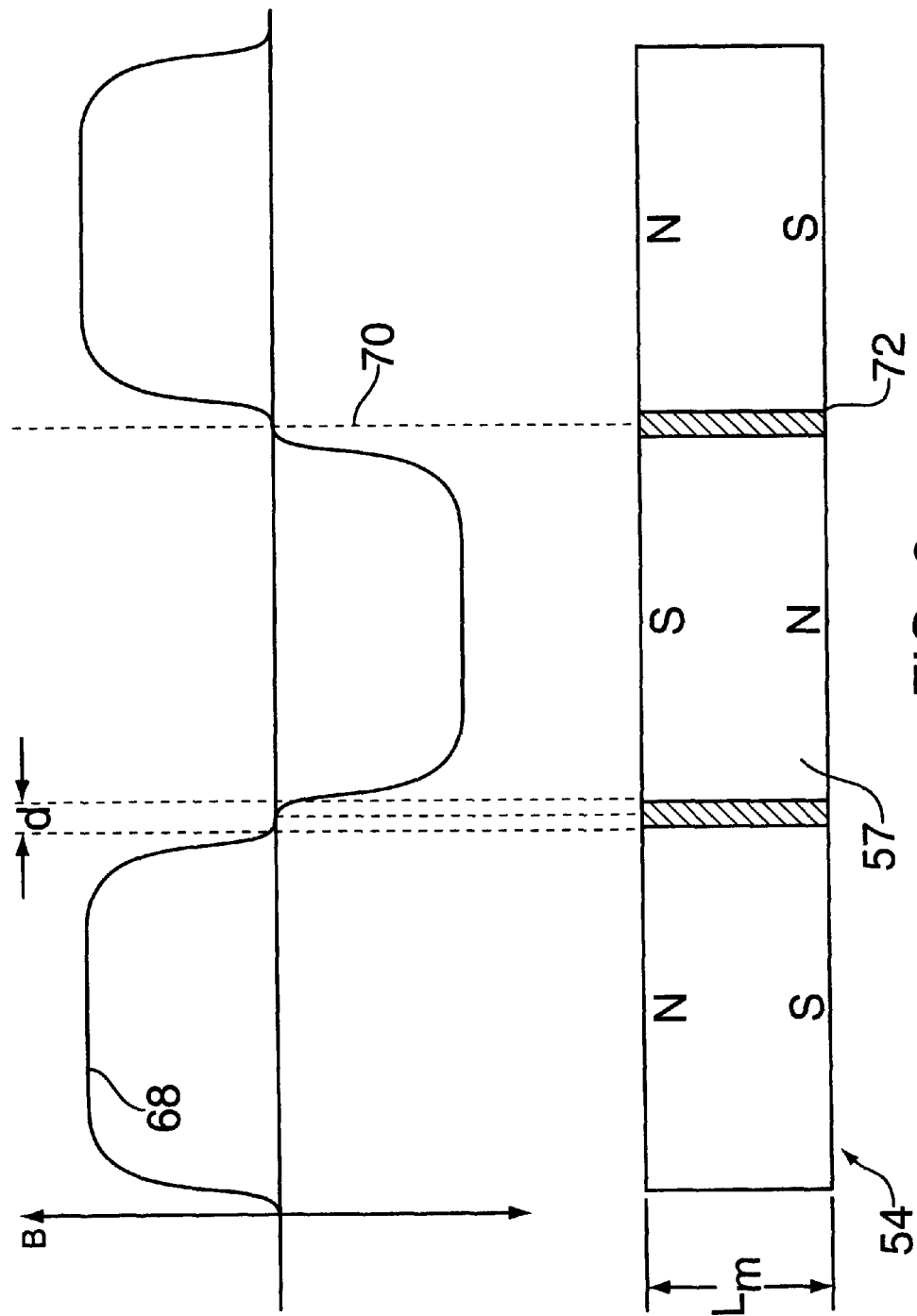
FIG. 6 is a graphical illustration of the magnetic flux emanating from a magnetic element.

FIG. 6 illustrates the axially-directed flux density B profile emanating from magnet pole faces assembled into the electric machine. The flux density is generally positive over North poles and negative over South poles. Between North and South poles the flux density passes through zero flux density at the midpoint 70 between poles of magnet 54. When magnet 54 is formed by a single piece of annular magnet material, the interpolar region 72 between magnet poles represents permanent magnet material that is nonuniformly magnetized due to limitations inherent in the magnetizing process. When magnet 54 is formed from a plurality of sector shaped magnets, the interpolar region 72 represents the unmagnetized adhesive or support structure holding the magnets together. The transition width d shown in FIG. 6 is the width generally over the midpoint 70 where the axial flux density is significantly diminished with respect to its peak value. As explained in further detail below, this transition width d is used as part of a design algorithm for the electric machine.

Electric Machine Design

As described in further detail below, two embodiments of an electric machine designed according to embodiments of the present invention will be shown. The first uses the conductor element design shown in FIG. 14, the second uses the conductor element design shown in FIGS. 16–20. According to an embodiment of the present invention, the magnetic and conductor elements are designed and the electric machine is designed so as to maximize the efficiency, motor constant, and power density of the electric machine. The embodiments described below have a modular design allowing a user to select the number of conductor elements and magnetic elements that are needed for a particular application.

First Embodiment

Figure 2:
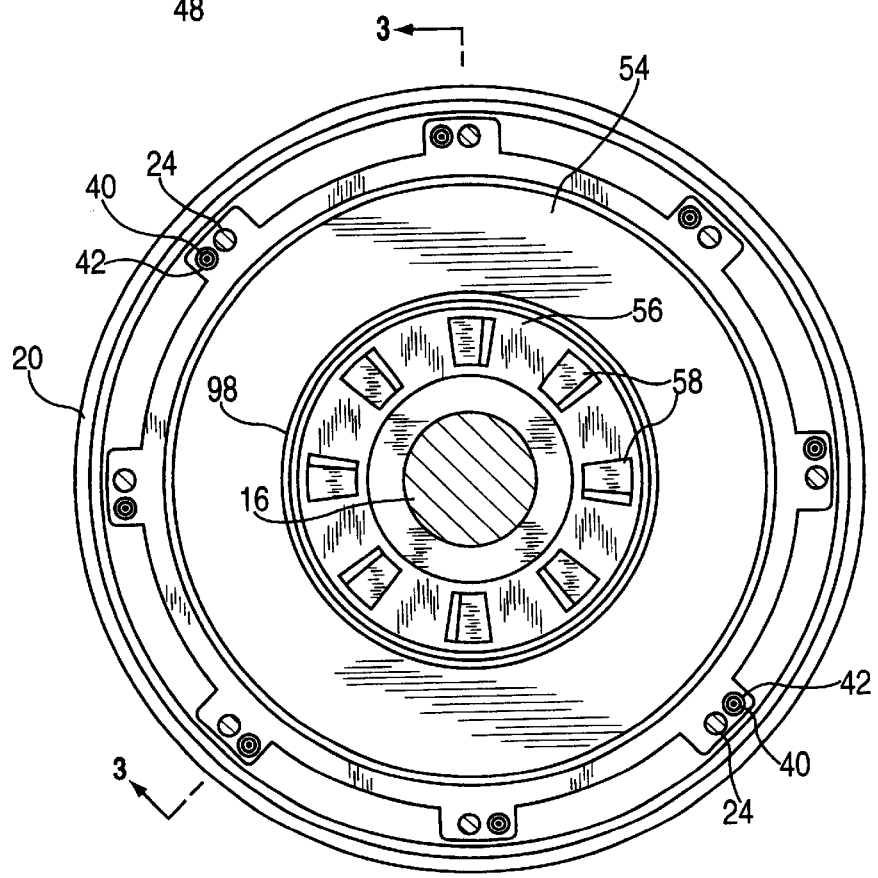
FIG. 2 is an enlarged sectional view taken on line 2—2 of FIG. 1.
Figure 3:
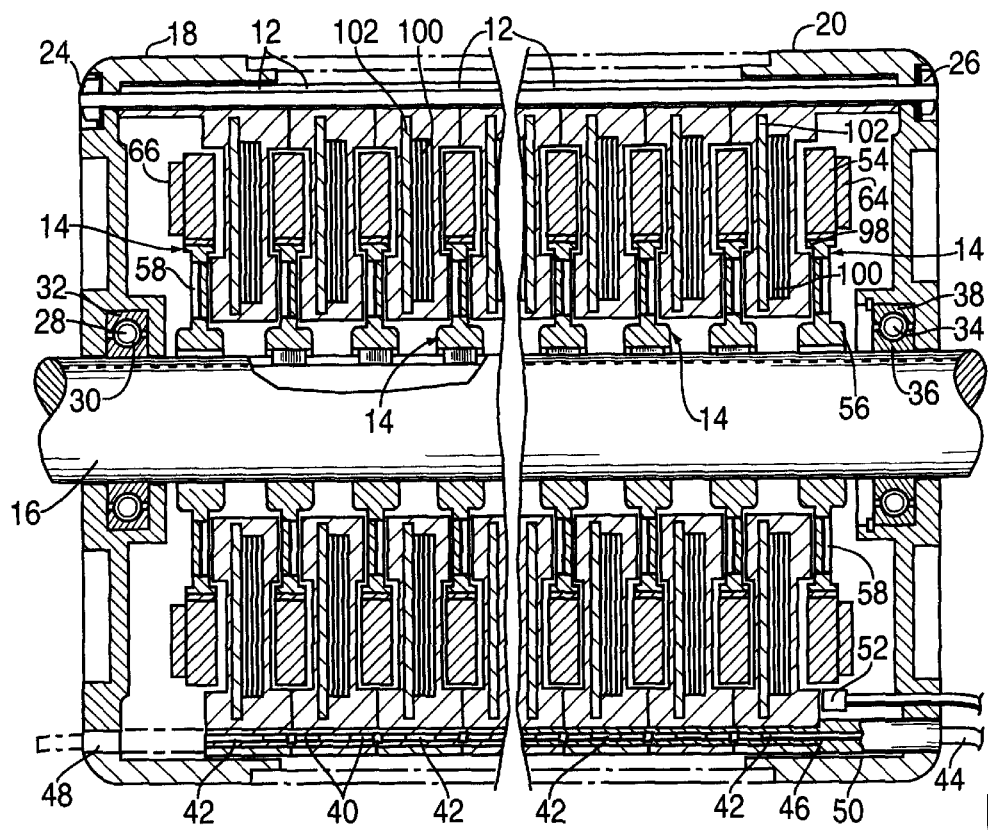
FIG. 3 is a sectional view taken on line 3—3 of FIG. 2.

As illustrated in FIGS. 1–3, a first embodiment of the axial field electric machine designed according to an embodiment of the present invention is shown. The axial field electric machine includes a housing 10 (the center section of which is shown removed), multiple stator assemblies 12 (e.g., each including a conductor element similar to the one shown in FIG. 14) connected to one another and disposed within housing 10, and magnetic elements 14 (e.g., similar to the one shown in FIG. 4) connected to a shaft 16 that extends axially through housing 10. In this example, the conductor elements make up the stator of the electric machine and the magnetic elements make up the rotor. One skilled in the art will appreciate that in an alternative embodiment, conductor elements can serve as the rotor and the magnetic elements can serve as the stator in the electric machine.

Housing 10 includes two endpieces 18 and 20, each having multiple housing ventilation openings 22. Housing 10 may also include at least one removable midsection piece between endpieces 18 and 20 that is indicated as a phantom line in FIGS. 1–3 but not shown for purposes of clarity. Endpieces 18 and 20 and the removable midsection pieces can be made of a light-weight plastic or metal (e.g., aluminum). Bolts 24 extend from endpiece 18 axially through housing 10 through each stator assembly 12 and are secured by nuts 26 at endpiece 20. At one end of housing 20, ball bearings 28 retained between a first bearing race 30 connected to shaft 16 and a second bearing race 32 connected to endpiece 18 facilitate rotation of shaft 16 with respect to housing 10. A similar bearing arrangement having ball bearings 34 retained between a first bearing race 36 connected to shaft 16 and a second bearing race 38 connected to endpiece 20 facilitate rotation of shaft 16 at the other end of housing 10.

In this embodiment, magnetic elements 14 are interleaved with stator assemblies 12 in the axial field electric machine. As shown in FIG. 14, conductor element 121 may include sockets 42 allowing any number of the stator assemblies 12 to be assembled into the electric machine. Conversely, the stator assemblies can be removed from the electric machine as desired. Removable pins 40 plug into sockets 42 to electrically connect each stator assembly 12 to an axially adjacent stator assembly 12. Accordingly, depending on the desired application (e.g., power output requirements), a selected number of stator assemblies 12 and magnetic elements 14 can be added to or subtracted from the electric machine as necessary.

Figure 11:
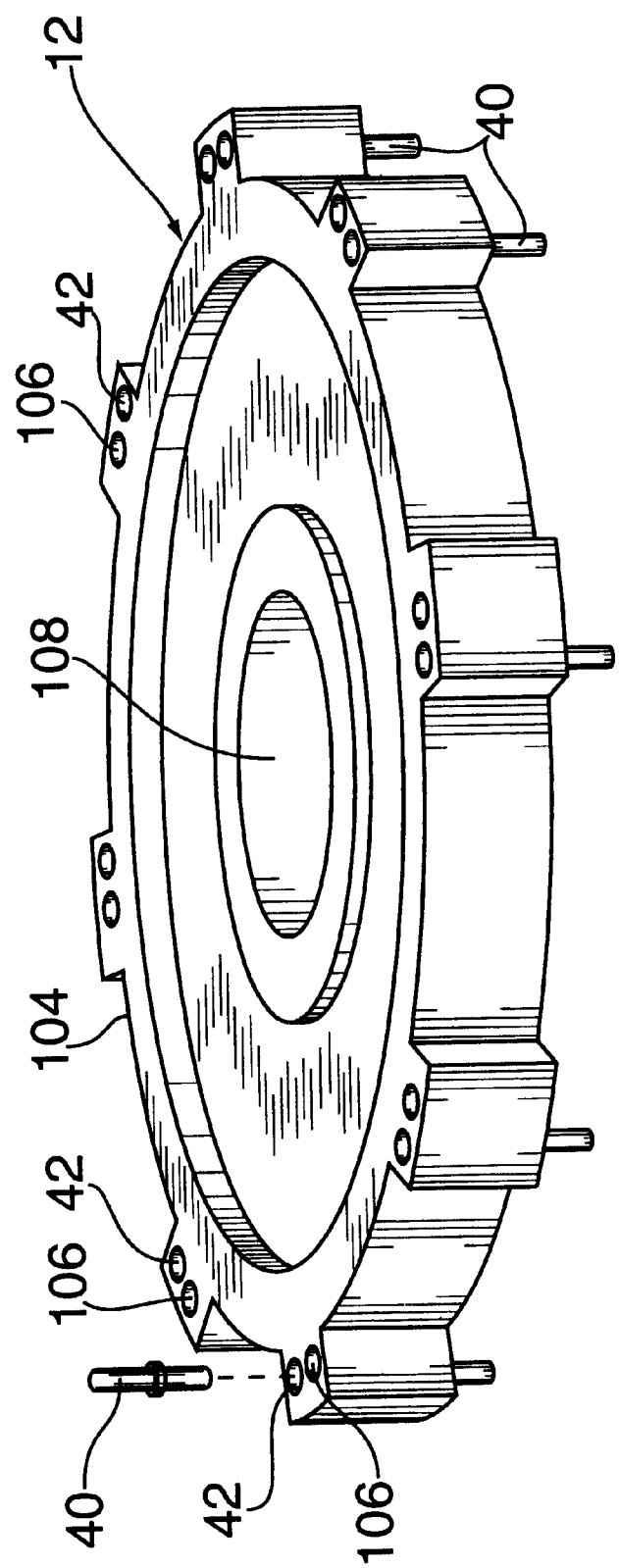
FIG. 11 is a pictorial view of a conductor element of the axial field electric machine.

An example of a stator assembly is shown in FIG. 11. In this embodiment, conductor element 121 is embedded, molded or similarly encased in a substantially annular stator casing 104 made of a suitable dielectric or insulative material. Stator assembly 12 has bores 106 through which bolts 24 may be extended to physically interconnect them, as described above with respect to FIGS. 1 and 2. As similarly described above, stator assembly 12 has sockets 42 that may be electrically interconnected by removable pins 40. Stator casing 104 has a central opening 108 through which shaft 16 extends when the electric machine is assembled, as illustrated in FIG. 2. The diameter of shaft 16 is less than that of central opening 108 to facilitate airflow through the axial field electric machine.

The modular construction of the electric machine facilitates selection of an operating voltage. Operating voltage is proportional to the total conductor length for each phase. Thus, an operating voltage may be selected by adjusting the total conductor length for each phase. Each stator assembly 12 has conductors 110, 112, 114 and 116, each defining one of the four phases. (See, e.g., FIG. 13.) By connecting, for example, conductor 110 in each stator assembly 12 in parallel with conductor 110 in all other stator assemblies 12, the total conductor length for phase-1 is minimized. Conversely, by connecting, for example, conductor 10 in each stator assembly 12 in series with conductor 110 in all other stator assemblies 12, the total conductor length for phase-1 is maximized. The modular construction facilitates selectively connecting the conductors of adjacent stator assemblies in either series or parallel.

One skilled in the art will appreciate that the magnetic element in the electric machine described herein can be replaced with an suitably constructed aluminum disk to operate the electric machine as an induction machine.

As illustrated in FIG. 1, each stator assembly 12 has indicia 158, 160 and 162, such as adhesive labels, each indicating one of the voltages that may be selected. An operating voltage can be selected by connecting each stator assembly 12 in an angular orientation in which the indicia indicating a certain voltage are aligned. Indicia 158 are labeled "120" to indicate 120 volts; indicia 160 are labeled "480" to indicate 480 volts; and indicia 162 are labeled "960" to indicate 960 volts. In the exemplary embodiment and the relative angular orientation of stator assemblies 12 shown in FIG. 1, indicia 158 are aligned to select an operating voltage of 120 volts. To change the operating voltage, one need only uncouple one or more stator assemblies 12 and rotate them to realign indicia 158 such that they align to indicate a different operating voltage.

Figure 23:
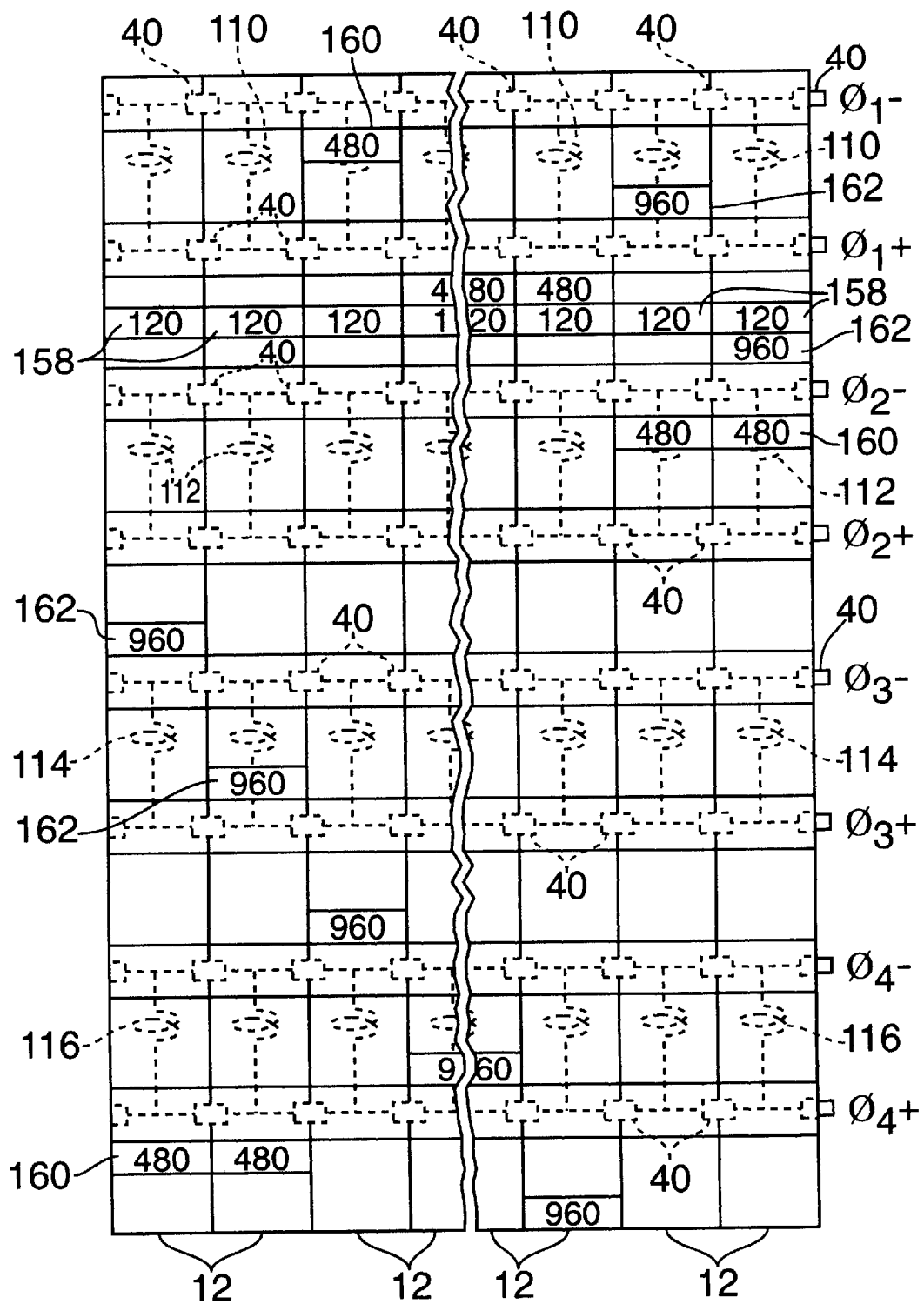
FIG. 23 is a schematic diagram of the conductor elements connected to one another in a configuration selected to operate the axial field electric machine at a first voltage.

As illustrated schematically in FIG. 23, stator assemblies 12 are interconnected to select a first operating voltage, such as 120 volts. Broken lines indicate an electrical connection. With respect to phase-1, each end of conductor 110 in each stator assembly 12 is connected by a removable pin 40 to the corresponding end of conductor 110 in another stator assembly 12. Thus, all conductors 110 are connected in parallel. Similarly, with respect to phase-2, each end of conductor 112 in each stator assembly 12 is connected by a removable pin 40 to the corresponding end of conductor 112 in another stator assembly 12. Thus, all conductors 112 are connected in parallel. All conductors 114 and 116 are similarly connected in parallel. Pins 40 at one of the endmost stator assemblies 12 may be connected to electrical power leads 44 (FIG. 1). It should be noted that all indicia 158 are aligned, but indicia 160 and indicia 162 are not aligned.

Figure 24:
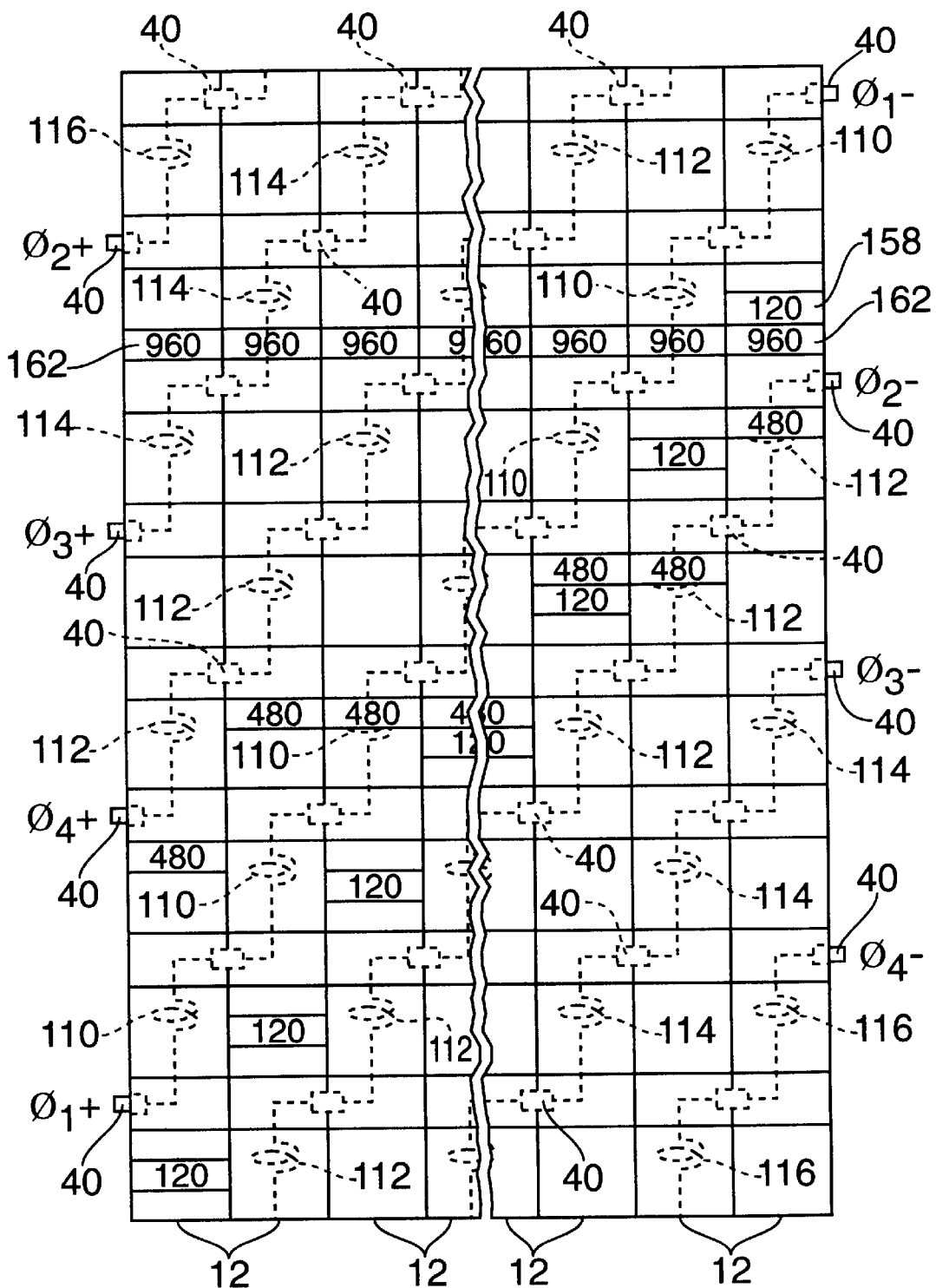
FIG. 24 is a schematic diagram of the conductor elements connected to one another in a configuration selected to operate the axial field electric machine at a second voltage.

As illustrated schematically in FIG. 24, stator assemblies 12 are interconnected to select a second operating voltage, such as 960 volts. As in FIG. 24, broken lines indicate an electrical connection. With respect to phase-1, with the exception of the two endmost stator assemblies 12, a first end of conductor 110 in each stator assembly 12 is connected by a removable pin 40 to a second end of conductor 110 in another stator assembly 12. Thus, all conductors 110 are connected in series. Similarly, with respect to phase-2, with the exception of the two endmost stator assemblies 12, a first end of conductor 112 in each stator assembly 12 is connected by a removable pin 40 to a second end of conductor 112 in another stator assembly 12. Thus, all conductors 112 are connected in series. All conductors 114 and 116 are similarly connected in series. Pins 40 at the endmost stator assemblies 12 may be connected to electrical power leads 44 (FIG. 1). It should be noted that all indicia 162 are aligned, but indicia 158 and indicia 160 are not aligned.

Figure 25:
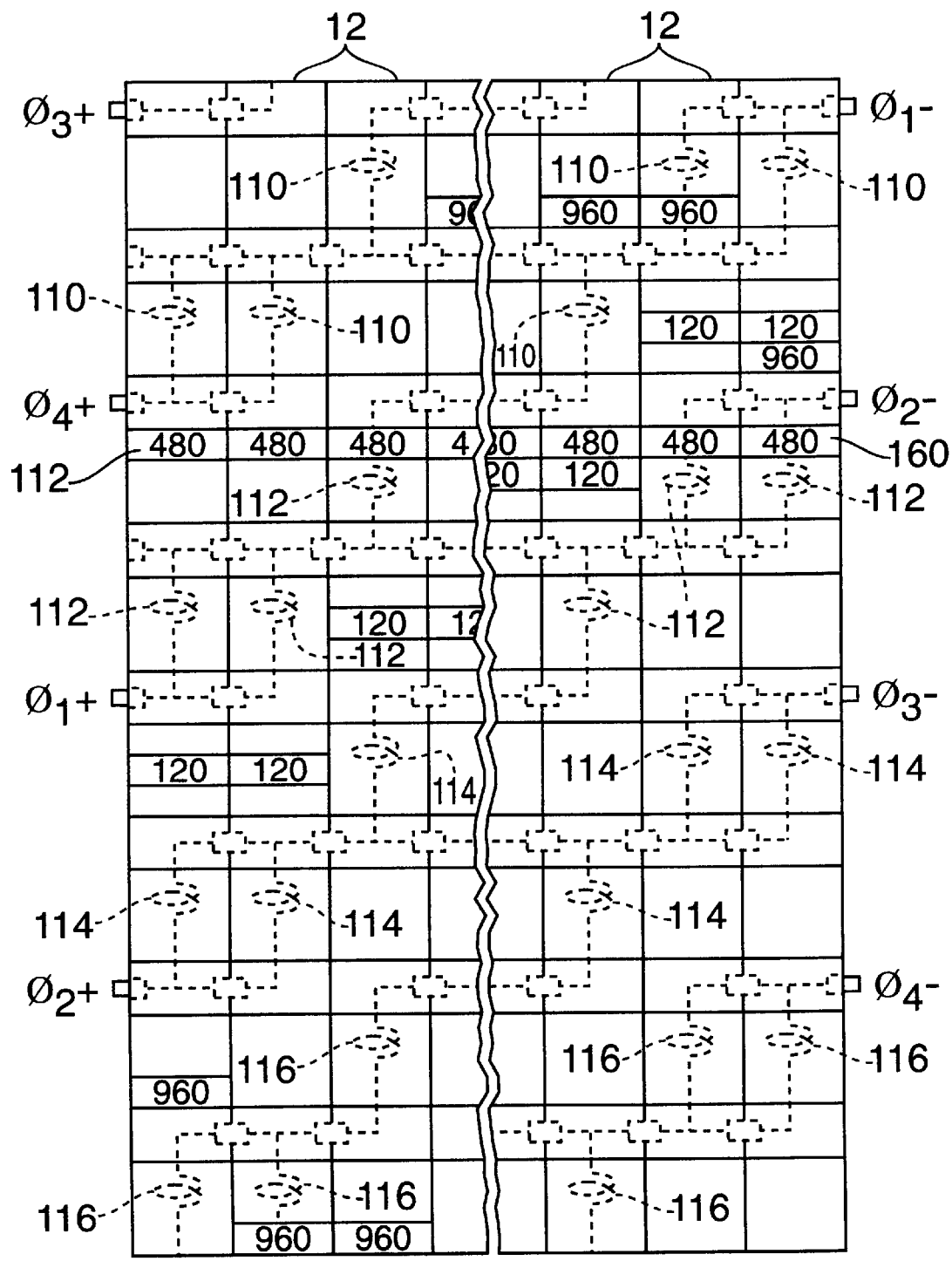
FIG. 25 is a schematic diagram of the conductor elements connected in a configuration selected to operate the axial field electric machine at a third voltage.

As illustrated schematically in FIG. 25, stator assemblies 12 are interconnected to select a third operating voltage, such as 480 volts. In the same manner as in FIGS. 23 and 24, broken lines indicate an electrical connection. With respect to phase-1, with the exception of the two endmost stator assemblies 12, the corresponding first and second ends of conductors 110 in two adjacent stator assemblies 12 are connected to each other by a removable pin 40; a first end of conductor 110 in one of those stator assemblies 12 is connected by a removable pin 40 to a second end of conductor 110 in a third stator assembly 12; and the corresponding first and second ends of conductors 110 in the third stator assembly 12 and an adjacent fourth stator assembly 12 are connected to each other by a removable pin 40. Thus, two conductors 110 are connected in parallel to form a group, and then these groups are connected in series. Similarly, with respect to phase-2, with the exception of the two endmost stator assemblies 12, the corresponding first and second ends of conductors 112 in two adjacent stator assemblies 12 are connected to each other by a removable pin 40; a first end of conductor 112 in one of those stator assemblies 12 is connected by a removable pin 40 to a second end of conductor 112 in a third stator assembly 12; and the corresponding first and second ends of conductors 112 in the third stator assembly 12 and an adjacent fourth stator assembly 12 are connected to each other by a removable pin 40. Thus, groups of two conductors 112 are connected in parallel, and then these groups are connected in series. All conductors 114 and 116 are similarly connected in parallel groups of two that are connected in series. Pins 40 at the endmost stator assemblies 12 may be connected to electrical power leads 44 (FIG. 1). It should be noted that all indicia 160 are aligned, but indicia 158 and indicia 162 are not aligned.

Those skilled in the art will appreciate that the conductors may be interconnected in various combinations of series and parallel groups to provide more than three selectable voltages. Moreover, the illustrated set of voltages is exemplary only; in view of the teachings herein, persons of skill in the art will readily be capable of constructing a electric machine operable at other voltages.

Electrical power leads 44 extend into housing 10 and have plugs 46 that connect to sockets 42 in one of the two endmost stator assemblies 12. Although FIG. 3 illustrates a power lead 44 connected to the endmost stator assembly 12 adjacent endpiece 20, it could alternatively be connected to the endmost stator assembly 12 adjacent endpiece 18 or an intermediate stator assembly 12. As illustrated in FIGS. 1 and 3, openings or ports 48 and 50 in endpieces 18 and 20, respectively, admit plugs 46 into housing 10. A sensor 52, such as a Hall-effect sensor, is mounted to endpiece 20. Sensor 52 is adjacent the endmost magnetic element 14 for sensing pole transitions, as described below with respect to the operation of the electric machine. One skilled in the art will appreciate that other devices can be used to sense pole transitions in a magnetic element 14. For example, an optical grating may be placed around the periphery of an magnetic element and an opticoupler can be used to sense reflected light from the grating using a stationary light source to indicate the position of the magnetic poles relative to the stator assemblies.

Second Embodiment

Figure 12:
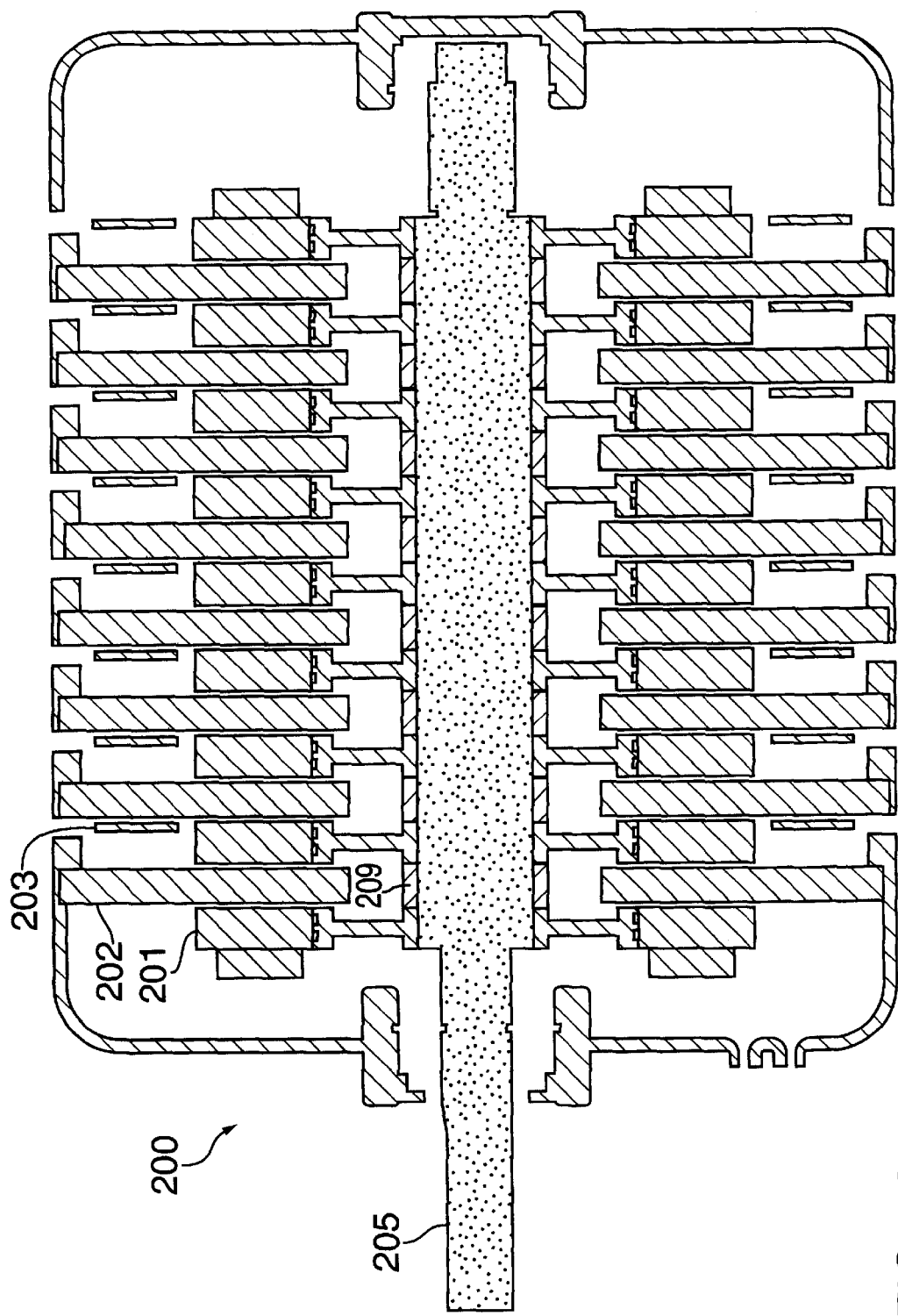
FIG. 12 is a cross-sectional view of an axial field electric machine constructed according to an embodiment of the present invention.

A second embodiment of the electric machine of the present invention is shown in FIGS. 12, 27–29 using the conductor element of FIGS. 16–20. Referring to FIG. 12, a cross section of this axial field electric machine is shown. The axial field electric machine 200 is similar in construction to the electric machine of FIGS. 1 and 3. Electric machine 200 includes a plurality of magnetic elements 201, such as rotor disks, attached to a shaft 205. In this example, shaft 205 has a configuration similar to that which is shown in FIG. 9. Hubs of axially adjacent magnetic elements are separated by a ring separator 209. Electric machine 200 includes a plurality of conductor elements 202 and connector support elements 203, the construction of which is described in further detail below. As with the electric machine design of FIGS. 1 and 3, electric machine 200 has a modular design in that any number of conductor elements 202 (and connector support elements 203) and magnetic elements 201 may be added to or subtracted from the electric machine as desired.

Figure 27:
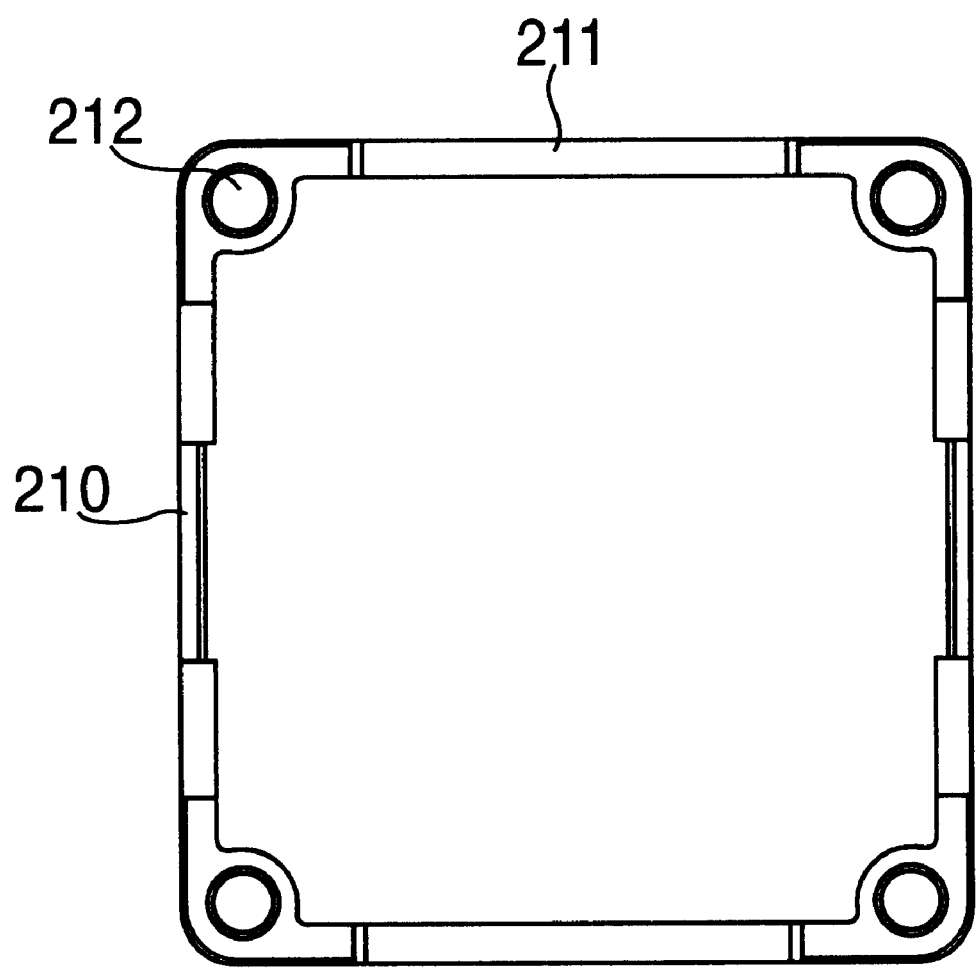
FIG. 27 is a plan view of a frame used for a conductor element in an axial field electric machine constructed according to an embodiment of the present invention.

In this embodiment, each conductor element includes a frame, such as frame 210 shown in FIG. 27. In the front view of FIG. 27, frame 210 includes mounting holes 212, for insertion of a bolt or the like to secure one frame to one or more such frames in the electric machine. Frame 210 also includes apertures 211 to allow air flow into and out of the electric machine.

Figure 28:
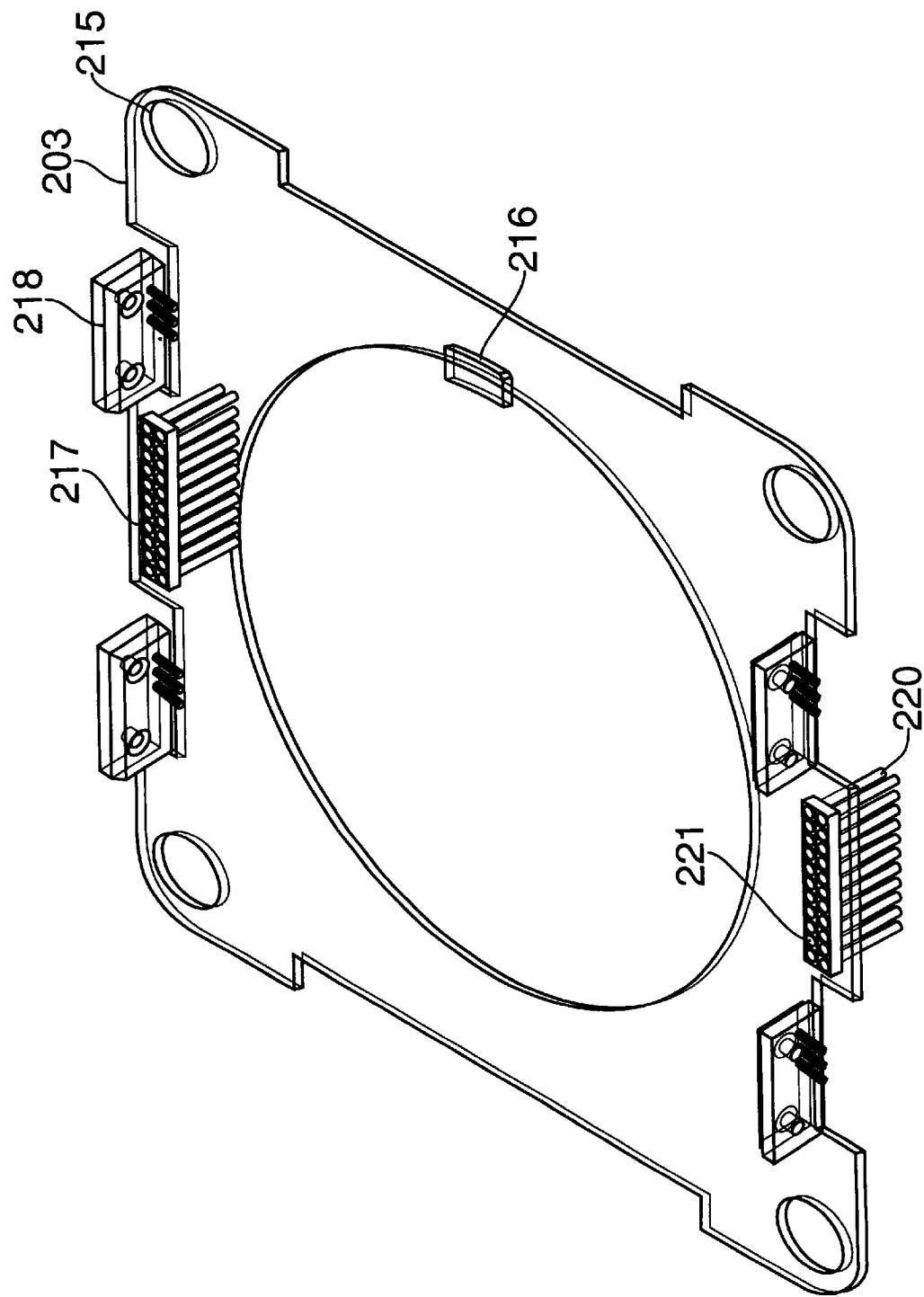
FIG. 28 is a view of a connector support element for an axial field electric machine constructed according to an embodiment of the present invention.

Referring to FIG. 28, a front view of the connector support element 203 is shown. The connector support element 203 also includes mounting holes 212 (as in FIG. 27) for mounting to an adjacent frame 210. Connector pin assemblies 217 are provided to electrically connect selected conductor phases of one conductor element to selected conductor phases of an axially adjacent connector assembly. In this embodiment, the connector pin assembly includes a number of pins 220 coupled to a number of sockets 221. Accordingly, pins 220 of one connector support element 203 mate with sockets 221 of an axially adjacent connector support element 203. A Hall sensor 216 can be provided for sensing pole transitions in a magnetic element rotating within an opening of the connector support element. Also, high voltage switches 218 can be provided to switch power on and off to the conductor phases of the conductor element (see FIG. 29).

Figure 29:
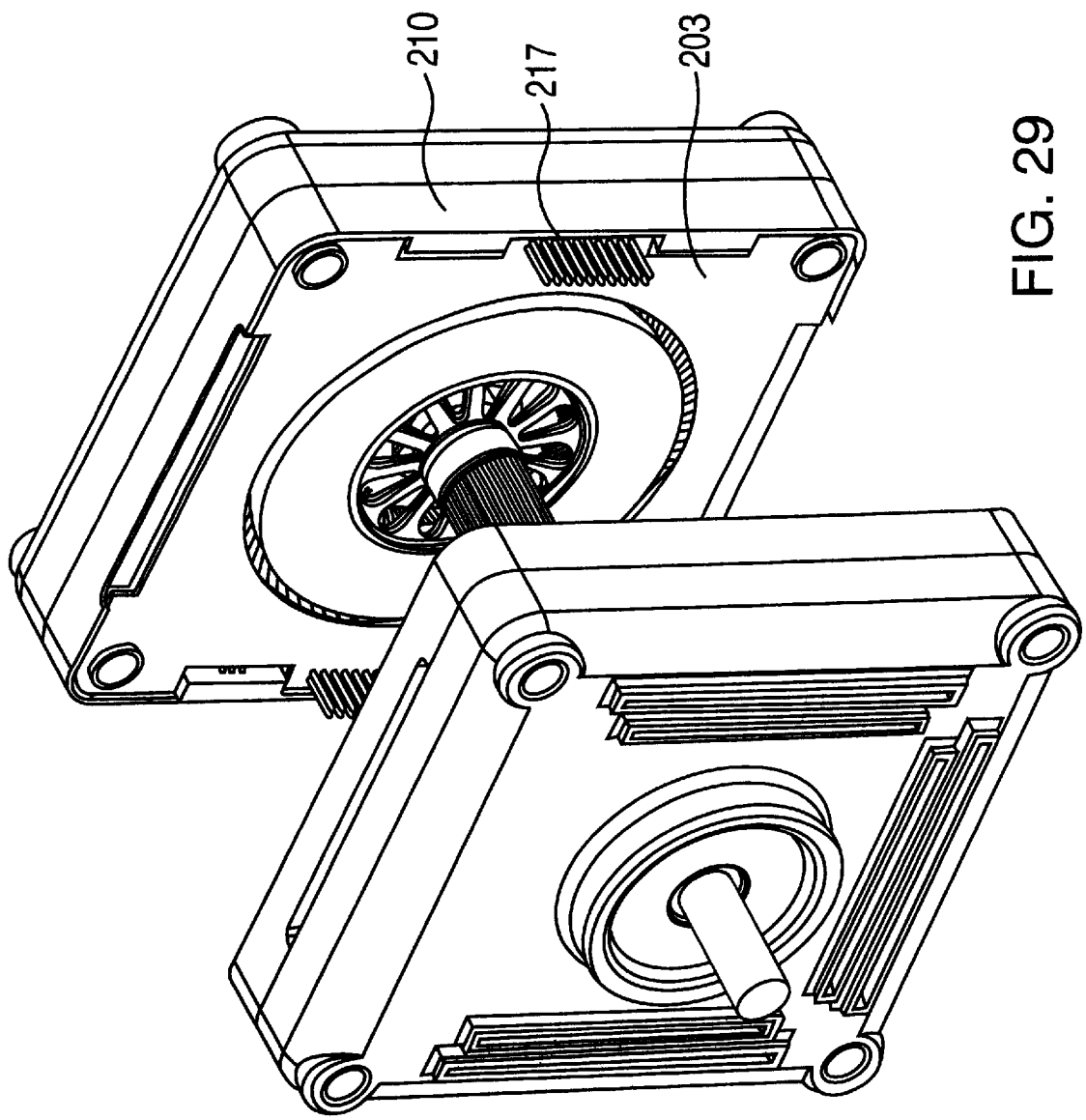
FIG. 29 is a view of a partially completed axial field electric machine constructed according to an embodiment of the present invention.

Referring to FIG. 29, a partially completed axial field electric machine is shown with a conductor element of FIGS. 16–20, the connector support element 203 of FIG. 28, and the magnet of FIG. 3. The high voltage switches 218 and connector pin assemblies 217 are selectively coupled to conductor phases of the conductor element. In this example, the conductor element is shown in FIG. 16 and includes mounting holes for mounting it to adjacent conductor elements.

Controller

Figure 21:
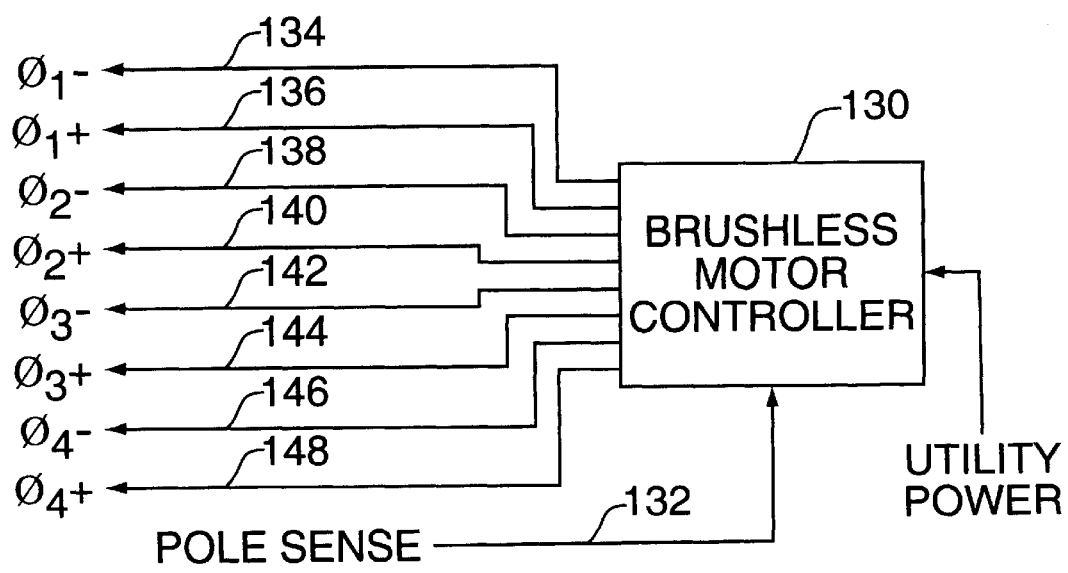
FIG. 21 is a block diagram of a motor controller.

As illustrated in FIG. 21, the electric machine may be configured as a motor by connecting a brushless motor controller 130 of an essentially conventional design. In this example, brushless motor controller 130 receives a pole sense signal 132 from sensor 52 (FIG. 3) and generates signals 134 ($\phi_1-$), 136 ($\phi_1+$), 138 ($\phi_2-$), 140 ($\phi_2+$), 142 ($\phi_3-$), 144 ($\phi_3+$), 146 ($\phi_4-$) and 148 ($\phi_4+$) for the conductor phases in conductor element 121 in FIG. 14. Signals 134, 136, 138, 140, 142, 144, 146 and 148 are coupled to electrical leads 44, as described above with respect to FIG. 2.

Figure 22:
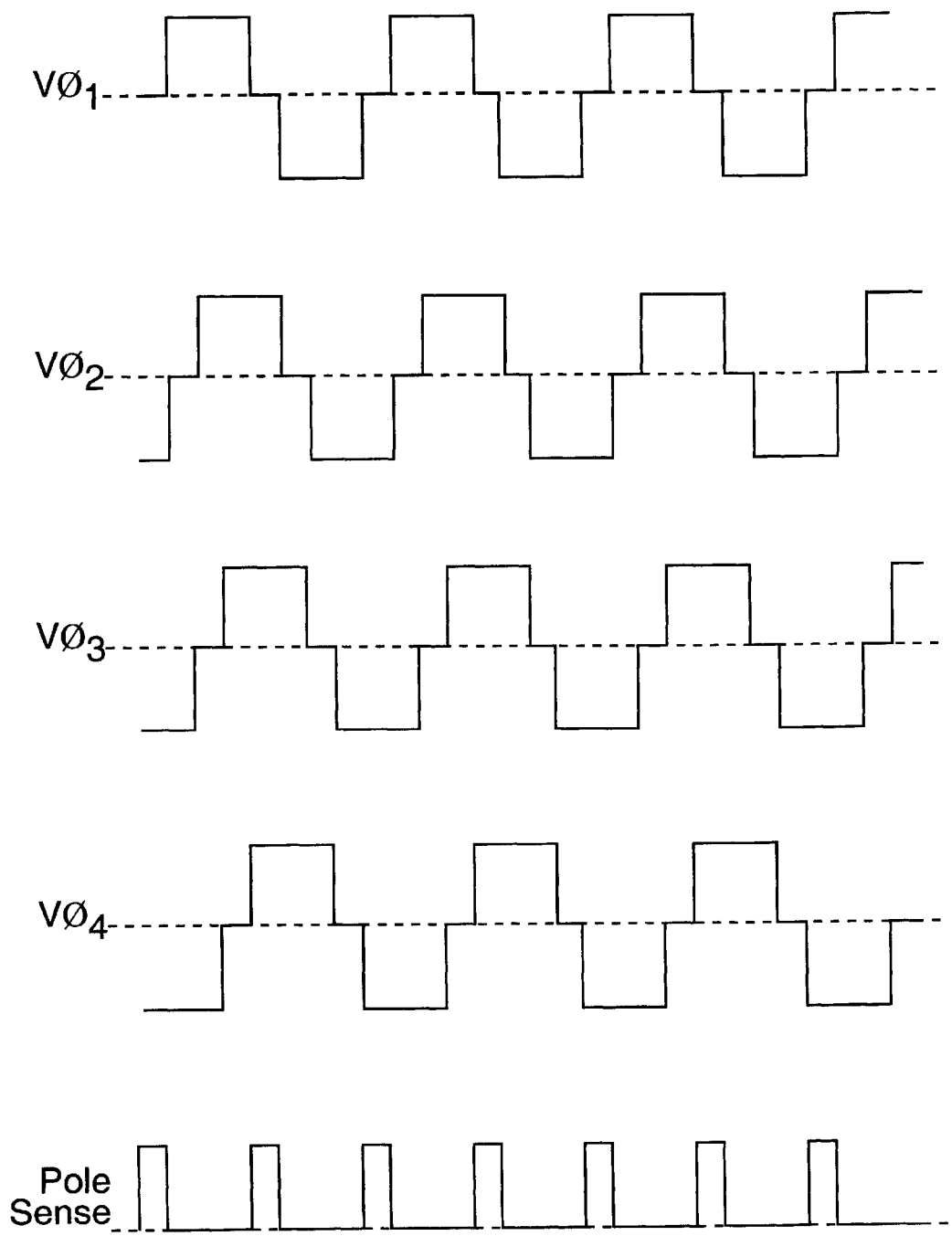
FIG. 22 is a timing; diagram of the motor signals generated by the motor controller of FIG. 21.

As shown in the timing diagram of FIG. 22, brushless motor controller 130 attempts to drive current in each phase while that phase is subjected to flux from a pole sector in magnet 54. As described in further detail herein, it is preferable if the width of the radial portion of the conductor phases that pass through the flux of the magnet 54 have a width that does not exceed the transition width d between adjacent poles as shown in FIG. 6. Accordingly, as a phase conductor travels across one magnet pole face, current is being driven into each phase conductor 75% of the time.

In the timing diagram of FIG. 22, the voltage amplitude signals for each of the phases are shown. In this example, the voltage amplitude for each phase fluctuates between +350V, 0V, and −350V D.C. The brushless motor controller 130 includes a chopping or pulse-width modulating (PWM) circuit, as is known in the art, which converts the D.C. voltage signal into a square wave signal having a duty cycle between 0 and 100%. In this example, the frequency of the pulse-width modulation is 20 KHz. Looking at the voltage signal for $\phi_1$, the signal is at 0V when the $\phi_1$ phase conductor is completely within a transition width between magnet poles. In FIG. 22, the pole sense signal is generated when a transition width is passing the pole sensor. As the phase conductor passes from the transition width to the next pole sector, the voltage amplitude jumps to ±350V (depending on direction of rotation) and the duty cycle is set to a low value (e.g., 5%). The duty cycle can be raised as the phase conductor moves into the pole sector, and the duty cycle is at a maximum when the phase conductor is completely within a pole sector. The selection of a maximum duty cycle depends on the desired current in each conductor phase (e.g., based on torque, speed, and/or power requirements). The duty cycle is again lowered when the phase conductor once again begins to move within the next transition width. The duty cycle is lowered to zero when the phase conductor is completely within the transition width. As the phase conductor moves into the next pole, the duty cycle is increased, but the voltage level is inverted (i.e., from positive to negative or negative to positive). In FIG. 22, one pole sense signal is generated which is related to the presence of the $\phi_1$ conductors in the transition width. Pole sense signals relative to the phase conductors $\phi_2-\phi_4$ can be generated based on the pole sense signal for $\phi_1$. Alternatively, pole sense signals can be generated for all poles (e.g., using an optical grating pattern around the periphery of a magnet).

The motor controller can be easily modified to provide the same voltage signals for any number of phases, such as the eight phases shown in FIG. 16 and the twelve phases shown in FIG. 20. In the case of eight phases, current will be conducted in each phase 87.5% of the time. In the case of twelve phases, current will be conducted in each phase 91.67% of the time.

As shown in these embodiments, only the phase conductor within the transition width d closest to the midpoint (e.g., 70 in FIG. 6) between magnet poles is nonconducting at any rotor position. Therefore at any given rotor position a motor having N phase windings will have 100(N−1)/N percent of its phase conductors conducting current and producing torque. As a result, the electric machine maximizes its conductor utilization, which maximizes efficiency, motor constant, and power density.

Design Considerations

With the structure of the axial field electric machine given above for the first embodiment, the specific design of the conductor elements 121 and the magnetic elements 14 to achieve high efficiency, high motor constant, and high power density is given below. With this design algorithm, the axial field electric machine of this embodiment minimizes the I²R loss denoted $P_r$ earlier, minimizes the core loss $P_c$, minimizes eddy current losses, and maximizes the production of torque. As a result, the electric machine will achieve and maintain high efficiency over a wide range of speeds, will exhibit a high motor constant, and achieve high power density because torque production is optimized.

Figure 30:
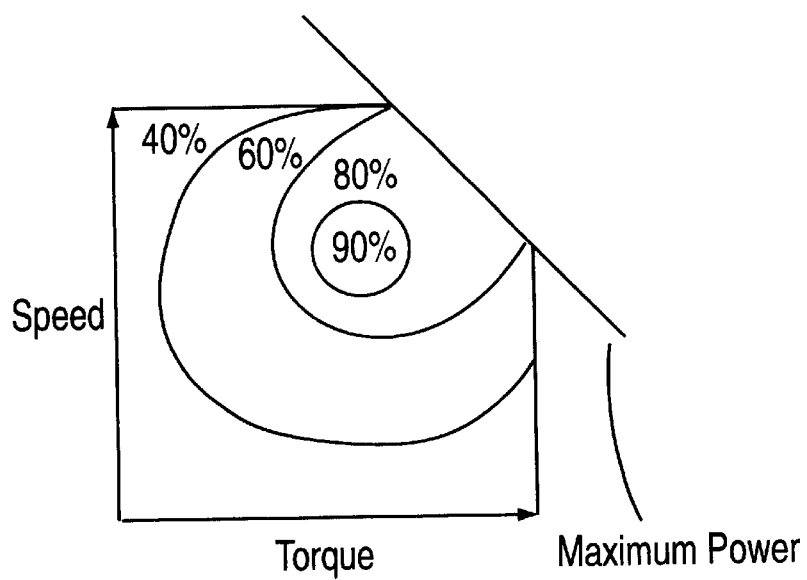
FIG. 30 is a graph depicting contours of constant efficiency for a typical electric machine known in the art.
Figure 31:
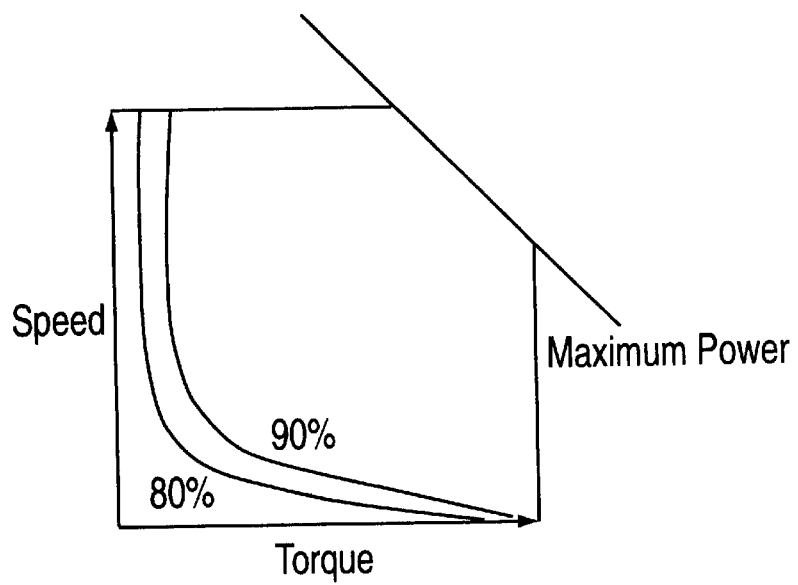
FIG. 31 is a graph depicting contours of constant efficiency for an electric machine constructed according to an embodiment of the present invention.

Referring to FIG. 31, a graph is shown of the efficiency of an electric machine constructed according to the present invention. In comparison to FIG. 30, the electric machine obtains a higher efficiency over a broader range of operating points. Accordingly, in a traction application requiring operation of the electric machine at several operating points, the average efficiency will be far in excess of a typical electric machine.

Figure 7:
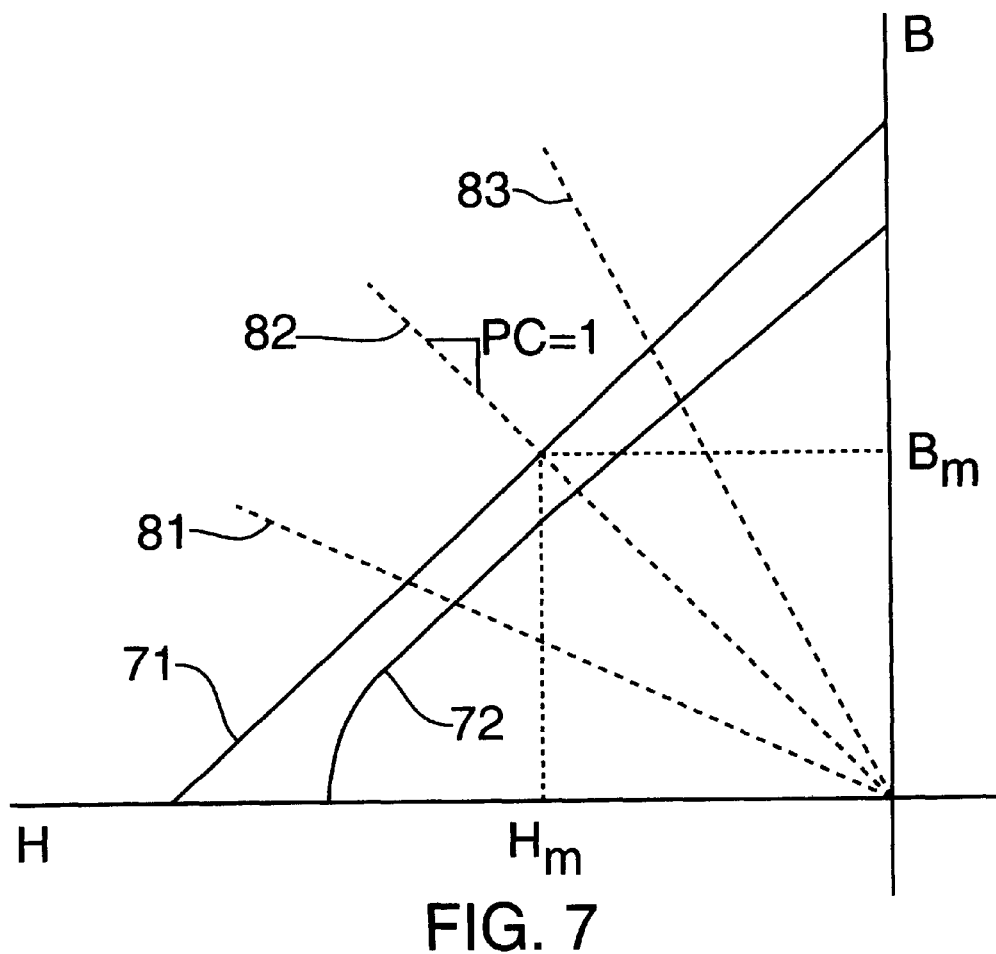
FIG. 7 is a plot showing the demagnetization characteristics of permanent magnets and the operating point of a magnet when used in an electric machine constructed according to the present invention.

A first design objective is to select an axial spacing between adjacent magnetic elements in the axial field electric machine. As discussed above, the stator assemblies 12 are disposed between adjacent magnetic elements. The permanent magnet flux, as described by its flux density B, that passes from one magnetic element axially through a stator assembly, then through the adjacent magnetic element determines the torque and back EMF (i.e., the performance) of the axial field electric machine. As such, it defines the operating point of the motor. This operating point is commonly characterized in the art as the intersection between the magnetic circuit load line and the demagnetization curve of the permanent magnet material used in the magnetic elements. Here the magnetic circuit is a mathematical characterization of the physical path taken by the magnetic field and its interaction with the materials in that path. Two example demagnetization curves of a magnet are shown in FIG. 7. As is known in the art, curve 71 is the demagnetization curve of a magnet that does not have a knee, whereas demagnetization curve 72 has a knee where the characteristic bends toward the horizontal axis when the curve nears the axis. The presence of a knee, the slope of the curves, and the intersection of the curves with the two axes is a function of the magnet material type as well as temperature, with higher performance and generally more expensive magnet material having higher points of intersection and no knee at room temperature.

Also shown in FIG. 7 are three example magnetic circuit load lines, 81, 82, and 83 each having a different slope. The absolute value of the load line slope is known in the art as the permeance coefficient, PC, which is illustrated in FIG. 7. In its simplest form, the permeance coefficient is approximated by $$PC = L_m/L_g \quad \text{(Eq. 3)}$$

where $L_m$ is the magnet length in the direction of magnetization (i.e., the axial direction in this invention) and $L_g$ is the net magnetic flux path length in air (including that through stator assemblies disposed between adjacent magnetic elements). Based on this approximation and with reference to FIG. 7, for a fixed magnet length $L_m$, the electric machine operating flux density $B_m$ is inversely proportional to $L_g$. See for example, $B_m$ marking flux density at the intersection of magnet demagnetization curve 71 and load line 82. As $L_g$ increases, the flux density operating point $B_m$ decreases and as $L_g$ decreases, $B_m$ increases.

With this understanding of the inverse relationship between the electric machine flux density operating point $B_m$ and the net magnetic flux path length in air $L_g$, the optimum spacing between magnetic elements is based on the ideas (a) if $L_g$ is zero, $B_m$ is maximized giving the potential for high torque since torque is proportional to flux density. However, if $L_g$ is zero there is no room between axially adjacent magnetic elements for stator assemblies containing conductor elements through which torque can be created. Therefore $L_g=0$ is not feasible. (b) On the other hand, if $L_g$ is made very large, the conductor elements can be made very thick in the axial direction, which minimizes the I²R losses. However, making $L_g$ large forces the flux density operating point $B_m$ to such a small value that little torque can be generated. Therefore making $L_g$ large is not feasible. (c) The product of field intensity H (i.e., the horizontal axis in FIG. 7) and flux density B (i.e., the vertical axis in FIG. 7) is energy density. As such, it is known in the art that operating a permanent magnet where the absolute value of the product of the flux density operating point $B_m$ and the field intensity point $H_m$ is greatest, maximizes the usable energy available from the magnet material. In other words, operating at the maximum energy density point provides the maximum flux density for the least magnet volume or mass. For an electric machine seeking to maximize power density, this is an optimum operating point. For most commonly available permanent magnet materials, the maximum energy density point occurs at or near a permeance coefficient of one. FIG. 7 illustrates this point at the intersection of demagnetization curve 71 and load line 82. Using this value, a permeance coefficient of one as dictated by Eq. 3 implies that the optimum spacing between adjacent magnetic elements ("S" in FIG. 15) is equal to the axial length of the magnet ($L_m$ in FIG. 6).

A second design objective is to determine the optimum size of the transition width ("d" in FIG. 6) between adjacent poles of a magnet 54. In the transition width area, flux emanating from one magnet pole flows in approximately a semicircular path to an adjacent pole on the same magnet 54, rather than traversing axially to an adjacent magnet. Under the assumption that the transition between axial flow to an adjacent magnet versus semicircular flow to an adacent magnet occurs when the flux paths are equal in length, the transition width is given by $$d = 2L_g/\pi \quad \text{(Eq. 4)}$$

where $L_g$ is the spacing 77 in FIG. 15. Therefore, once the spacing 77 is determined by the maximum energy density point of the magnet, Eq. 4 gives the transition width.

A third design objective is to determine the maximum width of each conductor phase, i.e., the section that extends radially in the conductor element through which torque producing magnetic flux flows, e.g., 131c in FIG. 16. According to an embodiment of the present invention, the maximum width of each conductor phase is selected to be no wider than the transition width d as given be Eq. 4. This choice maximizes motor efficiency as well as motor constant and power density for two reasons. First, it minimizes losses due to eddy currents induced in each conductor phase due to motion of the magnet 54. By limiting the width of the conductor phase to the transition width, at no time does any conductor phase simultaneously experience significant magnetic flux in both the North and South directions. As a result, there are no instants where significant eddy currents are induced in any conductor phase, which in turn increases motor efficiency and indirectly power density. Second, by limiting the width of conductor phases, more conductor phases can be placed radially around the circumference of the conductor element, thereby increasing the number of phase windings and the percentage of the conductor phases conducting current and producing torque simultaneously. As stated earlier, this maximizes torque production while minimizing losses. For example, the exemplary conductor element in FIG. 14 has thirty-two radial sections and four phase windings or motor phases. The number of motor phases is generally given by length of the outer periphery of sector 57 divided by the transition width. The number of motor phases is in effect the number of transition widths that fit within sector 57. If R is the outer radius of a sector 57, $N_s$ is the number of sectors needed to form a complete annulus, and d is the transition width, the number of motor phases $N_p$ is given by $$N_p = (2\pi R)/(dN_s) \quad \text{(Eq. 5)}$$

Those skilled in the art will recognize that some dimensional variations in R and d are typically required to make the number of motor phases given by Eq. 5 closely approximate an integer.

Uses

Figure 26:
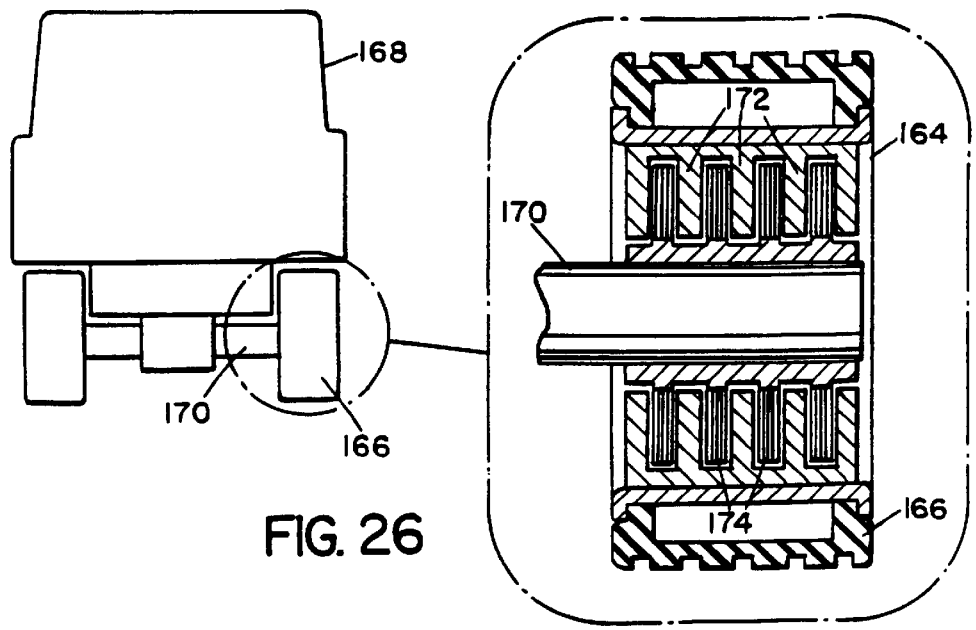
FIG. 26 is, in part, a front elevation view of a vehicle having the axial field electric machine disposed within a wheel and, in part, a cross-sectional detail view of an alternative embodiment of the axial field electric machine suitable for installation within the wheel.

The axial field electric machine may be used to power any suitable type of device, machine or vehicle. For example, it may be used in domestic appliances such as refrigerators and washing machines. It may also be used to power vehicles such as automobiles, trains and boats. One such use as a power plant in a vehicle is illustrated in FIG. 26. In the embodiment illustrated in FIG. 26, the axial field electric machine is mounted in a casing 164 that functions as the hub for a traction device such as the rubber tire 166 of an automotive vehicle 168. The shaft 170 is fixedly, i.e., non-rotatably, connected to the body of vehicle 168. The rotor disks 172, which are of substantially the same construction as described above with respect to other embodiments, are fixedly connected to casing 164 and thus rotate with tire 166. The stator assemblies 174 are fixedly connected to shaft 170 but are otherwise constructed as described above with respect to other embodiments. In operation, the rotation of rotor disks 172 propels the vehicle while the shaft remains stationary with respect to the ground.

Figure 8:
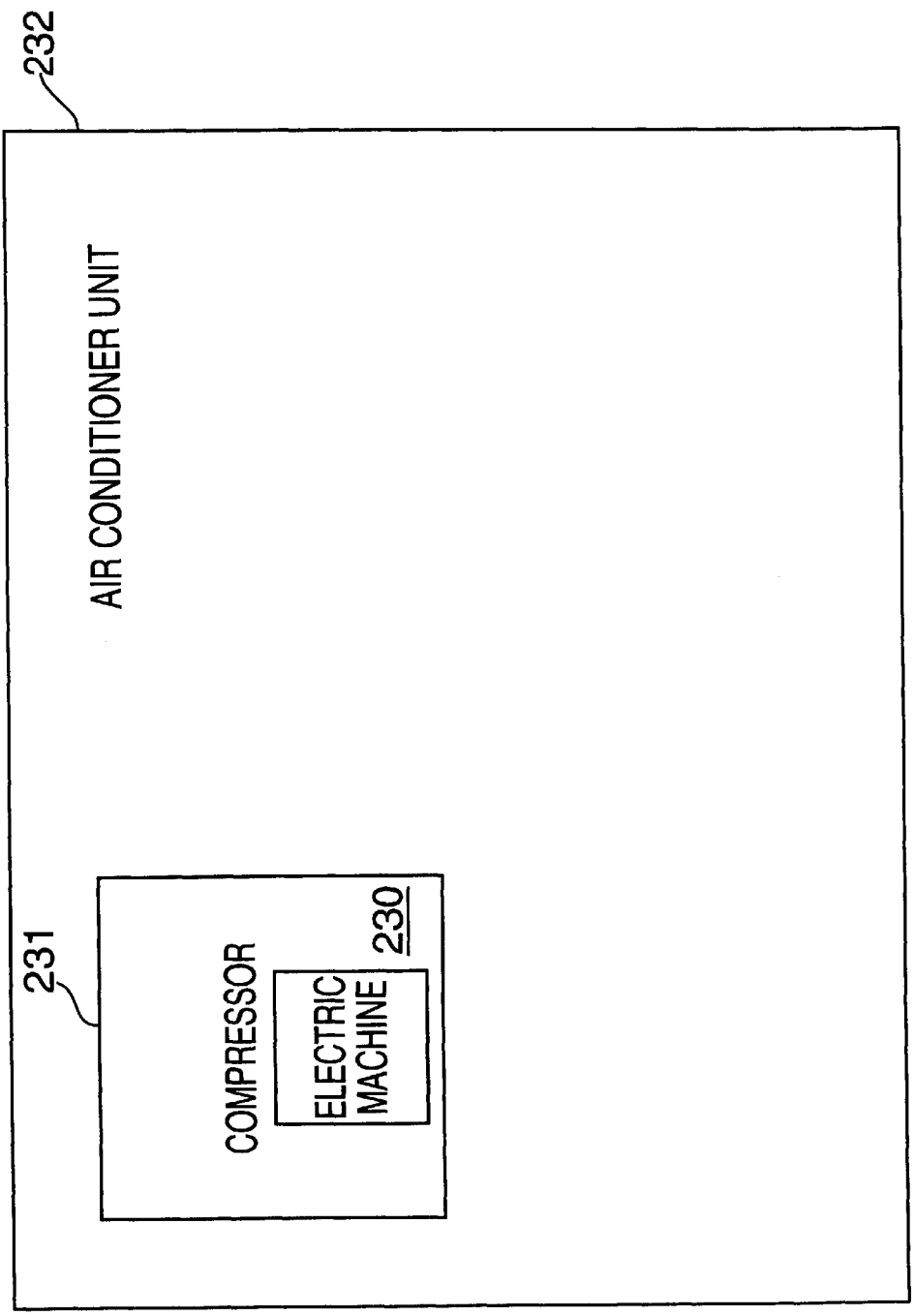
FIG. 8 is a block diagram showing an air conditioner unit including an axial field electric machine constructed according to an embodiment of the present invention.

In another application shown in FIG. 8, the axial field electric machine of the present invention can be used to reduce operating costs for an air conditioner unit. In FIG. 8, an axial field electric machine 230 operating as a motor and constructed according to an embodiment of the present invention is coupled to a compressor 231 in the air conditioner unit 232. Due to its small size (i.e., relative to other motors used in these units) and high efficiency, the axial field electric machine 230 can be sealed within the compressor 231 in the air conditioner unit 232. Because of the high efficiency of electric machine 230, the operating costs for the air conditioner unit 232 can be substantially reduced.

The axial field electric machine of the present invention can be used in a variety of other applications. While this electric machine can be used in virtually any electric machine application, its high efficiency, motor constant, and power density make it attractive for applications where these traits have significant value to the end user or product. For example, the electric machine of the present invention is attractive for many battery driven applications such as electric vehicles, including wheel chairs, scooters for elderly people, golf carts, and undersea vehicles. In these applications, the low mass and high efficiency of the present invention increases the vehicle range before battery recharging. The electric machine of the present invention is also valuable in other portable applications such as portable generators for commercial and military use. In these applications, the low mass of the present invention makes it easier to transport the end product and also saves fuel due to the increased energy conversion efficiency of the generator. Yet another area where the electric machine of the present invention will be useful is in applications requiring tight integration of the electric machine with the end product. Examples in this area include robotics, semiconductor processing equipment, embedded pumps and compressors, and a variety of other high throughput automatic tasks. As it stands, the electric machine of the present invention is superior or competitive in almost all applications. The degree to which it makes inroads in any application is dependent upon the degree with which high efficiency, motor constant, and power density impact the end product in which the electric machine appear. For example, it is unlikely that the electric machine of the present invention will become popular in hand-held consumer hair dryers, residential vacuum cleaners, and consumer appliances. Since high efficiency, motor constant, and power density are not as important as cost in these applications, the present invention will appear in these applications only if the materials and manufacturing cost of the present invention become competitive with the electric machines currently used in these applications.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An axial field electric machine comprising:
   a conductor element including a plurality of subassemblies, each subassembly comprising:
      a substrate having first and second sides, a center and a periphery;
      a plurality of first conductors on the first side of said substrate,
      each of said first conductors including a radial portion extending in a generally radial direction from the periphery to the center of said substrate;
      a plurality of second conductors disposed on the second side of said substrate;
      each of said second conductors including a radial portion extending in a generally radial direction from the periphery to the center of said substrate; and
      said substrate including a plurality of inter-side through holes extending between and coupling selected ones of the first conductors to selected ones of the second conductors; and
      a plurality of terminal through holes extending between adjacent subassemblies and coupling selected ones of the first and second conductors in one subassembly to selected ones of the first and second conductors in an adjacent subassembly;
   first and second magnetic elements disposed axially adjacent to said first and second sides of said conductor element, each of said first and second magnetic elements having an outer face and a plurality of adjacent magnetic poles; and first and second endplates coupled to the outer faces of said first and second magnetic element, respectively, each of said endplates being made of a material so that flux from a first magnetic pole flows to adjacent magnetic poles of the first and second magnetic elements; said conductor element and said first and second magnetic elements are adapted to rotate relative to each other.

2. The axial field electric motor of claim 1 further comprising:

a shaft capable of rotation, said first and second magnetic elements being coupled to said shaft.

* * * * *